(12) United States Patent
Toffe et al.

(10) Patent No.: US 11,871,281 B2
(45) Date of Patent: Jan. 9, 2024

(54) SYSTEMS AND METHODS FOR COOPERATIVE COMMUNICATION USING INTERFERING SIGNALS

(71) Applicant: Apple Inc., Cupertino, CA (US)

(72) Inventors: Anatoliy Sergey Toffe, Sunnyvale, CA (US); Lydi Smaini, San Jose, CA (US); Rastislav Vazny, Sunnyvale, CA (US); Ronald William Dimpflmaier, Los Gatos, CA (US); Alexander Sayenko, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/942,989

(22) Filed: Sep. 12, 2022

(65) Prior Publication Data
US 2023/0007539 A1    Jan. 5, 2023

Related U.S. Application Data

(63) Continuation of application No. 17/081,785, filed on Oct. 27, 2020.
(Continued)

(51) Int. Cl.
*H04W 28/20* (2009.01)
*H04W 72/0453* (2023.01)
(Continued)

(52) U.S. Cl.
CPC ....... *H04W 28/20* (2013.01); *H04W 28/0831* (2020.05); *H04W 28/26* (2013.01); *H04W 72/0453* (2013.01)

(58) Field of Classification Search
CPC ......... H04W 72/1215; H04W 72/0453; H04W 28/20; H04W 28/0831; H04W 28/26
See application file for complete search history.

(56) References Cited

U.S. PATENT DOCUMENTS

| | | |
|---|---|---|
| 2012/0195286 A1 | 8/2012 | Kim et al. |
| 2015/0133185 A1 | 5/2015 | Chen et al. |

(Continued)

FOREIGN PATENT DOCUMENTS

KR    20120015977 A    2/2012

*Primary Examiner* — Anez C Ebrahim
(74) *Attorney, Agent, or Firm* — FLETCHER YODER PC

(57) ABSTRACT

An electronic device discussed herein may include radio frequency communication circuitry for communication on a radio frequency network according to a communication configuration, a processor, and memory. The memory may store instructions that, when executed by the processor, cause the electronic device to perform operations including receiving, a first muting configuration indicating when the radio frequency communication circuitry is to communicate using a first type of communication on a first frequency band and when the radio frequency communication circuitry is to communicate using a second type of communication on a second frequency band, where the first frequency band may overlap with the second frequency band. The memory may store instructions that, when executed by the processor, cause the electronic device to perform operations including transmitting or receiving a data packet using the radio frequency communication circuitry according to the communication configuration.

20 Claims, 19 Drawing Sheets

Related U.S. Application Data

(60) Provisional application No. 62/948,072, filed on Dec. 13, 2019, provisional application No. 62/931,534, filed on Nov. 6, 2019.

(51) Int. Cl.
*H04W 28/08* (2023.01)
*H04W 28/26* (2009.01)

(56) References Cited

U.S. PATENT DOCUMENTS

| | | | |
|---|---|---|---|
| 2015/0249736 A1* | 9/2015 | Johnston | H04M 1/6008 |
| | | | 455/418 |
| 2017/0033907 A1 | 2/2017 | Guan et al. | |
| 2019/0373666 A1 | 12/2019 | Khan | |
| 2020/0107383 A1* | 4/2020 | Novlan | H04W 76/15 |
| 2021/0297215 A1 | 9/2021 | Da et al. | |

* cited by examiner

SYSTEMS AND METHODS FOR COOPERATIVE COMMUNICATION USING INTERFERING SIGNALS

CROSS-REFERENCE TO RELATED APPLICATIONS

This application is a continuation of a U.S. patent application Ser. No. 17/081,785, filed Oct. 27, 2020 and entitled "SYSTEMS AND METHODS FOR COOPERATIVE COMMUNICATION USING INTERFERING SIGNALS," which claims priority to and the benefit of U.S. Provisional Patent Application No. 62/931,534, filed Nov. 6, 2019, and entitled, "PROTECTION OF UWB SERVICES COLOCATED WITH A LICENSED NETWORK," and of U.S. Provisional Patent Application No. 62/948,072, filed Dec. 13, 2019, and entitled "SYSTEMS AND METHODS FOR COOPERATIVE COMMUNICATION USING INTERFERING SIGNALS," each of which is incorporated herein by reference in its entirety for all purposes.

BACKGROUND

The present disclosure relates generally to electronic devices, and more particularly, to electronic devices that utilize radio frequency signals, transmitters, and receivers for wireless communication.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and/or receivers are commonly included in various electronic devices, and more particularly, portable electronic communication devices, such as phones (e.g., mobile and cellular phones, cordless phones, personal assistance devices), computers (e.g., laptops, tablet computers), internet connectivity routers (e.g., WI-FI® routers or modems), radios, televisions, or any of various other stationary or handheld devices, to enable communication. In some electronic devices, a transmitter and a receiver are combined to form a transceiver. For ease of discussion, transceivers are discussed in the present disclosure, but it should be understood that the following descriptions may apply individually to receivers and/or transmitters (e.g., that may not be included in a transceiver).

Transceivers may transmit and/or receive wireless signals by way of an antenna coupled to the transceiver. Specifically, a wireless transceiver may wirelessly communicate voice and/or data signals over a network channel or other medium (e.g., air) to and from one or more external wireless devices. Wireless data communication may involve transmitting and/or receiving carrier signals (e.g., radio frequency (RF) signals) indicative of the data. By way of example, an electronic device may include a transceiver to transmit and/or receive the RF signals over one or more frequencies of a wireless network (e.g., an RF network). Transceivers may be installed on a printed circuit board (PCB) with signal processing circuitry associated with processing a carrier signal before and/or after wireless transmission into the air. The transceiver may include a variety of circuitry, including, for example, processing circuitry to modulate a data signal onto a carrier wave to generate an RF signal. The transmitter of the transceiver may also include power circuitry, such as a power amplifier (e.g., amplifying circuitry), to increase a power level of the RF signal so that the transmitter may effectively transmit the RF signal into the air via an antenna. Some electronic devices may have circuitry of the transceiver disposed on different, stacked PCBs.

The information to be transmitted is typically modulated onto the RF signal prior to wireless transmission. In other words, the information to be transmitted is typically embedded in an envelope of a carrier signal that has a frequency in the RF range. The envelope is typically referred to as the baseband signal. To embed or extract the information in or from the envelope of the carrier signal, processing may be performed on a received RF signal according to transmission parameters. For example, an electronic device (e.g., user equipment) may demodulate the RF signal (e.g., to remove the carrier signal) to recover the embedded information in the envelope based at least in part on a frequency of the received RF signal.

Furthermore, a transceiver may enable an electronic device to communicate with an RF network provider via a base station of the wireless network. The transmission parameters and other settings, such as information used to authenticate an electronic device to the RF network, may be provided to the electronic device by way of a subscriber identification module (SIM) card. The RF network may be a wireless network, such as WI-FI®, that facilitates the wireless transmission of information between the electronic device and the RF network provider. The RF network may communicate with the electronic device using information associated with the SIM card and may sometimes perform this communication via a frequency band that overlaps with a frequency band used for device-to-device communications. These device-to-device communications may be exchanged locally and/or over an unregistered network (e.g., a wireless network that an electronic device does not register to before communication) rather than via communication with the RF network. In some cases, the device-to-device communications may use an ultra-wideband (UWB) frequency band and/or UWB communications associated with UWB services accessible by the electronic device.

For example, a first electronic device may wirelessly transmit data to an RF network (e.g., a fifth generation (5G) New Radio (NR)) using a first frequency band and a second electronic device may transmit a device-to-device communication to a third electronic device using a second frequency band. In some cases, the first frequency band at least partially interferes with the second frequency band (e.g., overlapping in eligible transmission frequencies of the frequencies bands). For example, the first frequency band may correspond to an NR frequency band and the second frequency band may correspond to a UWB frequency band. It is noted that for purposes of this disclosure, the NR frequency band may correspond to frequencies between 7 gigahertz (GHz) and 25 GHz (e.g., less than 25 GHz, greater than 7 GHz, between 7.125 GHz and 24.25 GHz) and/or the ultra-wideband (UWB) frequency band may correspond frequencies between 3 GHz and 11 GHz (e.g., between 3.1 GHz and 10.6 GHz, between 6.24 GHz and 8.736 GHz, between 3.55 GHz and 3.7 GHz). As such, when the RF network and the first electronic device communicate on the first frequency band while the second electronic device and the third electronic device communicate on the second frequency band, either or both communications may be compromised and/or experience interference due to the using first frequency band overlapping with the second frequency band.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To avoid or reduce interference between a first electronic device communicating with a radio frequency network (e.g., a fifth generation (5G) network, a New Radio (NR) network, a fourth generation (4G) network, a Long Term Evolution (LTE) network), a third generation (3G) network) on a first frequency band and a second electronic device communicating with a third electronic device on a second frequency band (e.g., an ultra-wideband (UWB) frequency band), systems, devices, and methods are disclosed that cause a base station to temporarily mute communications on the radio frequency network to permit a duration of time during which the second and third electronic devices may communicate on the second frequency band. The base station may generate muting configurations that define muting durations (e.g., period or durations of time during which communications on using the first frequency band are stopped or paused to permit communications using the second frequency band). In this way, a muting configuration may define when radio frequency communication circuitry (RF circuitry) of the first electronic device is to communicate using a first type of communication (e.g., on the first frequency band) and when the RF circuitry of the second electronic device and/or the third electronic device is to communicate using a second type of communication (e.g., on the second frequency band). The first electronic device, the second electronic device, the third electronic device, and/or the base station may each operate in accordance with the muting durations to coordinate otherwise interfering communications (e.g., communications transmitted via at least partially overlapping frequency bands).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Various processes may be used to generate muting configurations. The processes may apply to a variety of electronic devices. For example, a first electronic device may wirelessly transmit data to an RF network (e.g., a fifth generation (5G) New Radio (NR)) using a first frequency band and a second electronic device may transmit a device-to-device communication to a third electronic device using a second frequency band. The electronic devices may communicate according to communication configurations and a base station of the RF network may communicate according to a communication configuration generated based at least in part on a muting configuration. The base station may use muting durations defined by the muting configuration to provide the second electronic device and the third electronic device a period of time during which to communicate using the second frequency band. It is noted that in some cases the first electronic device may communicate using the second frequency band with the second electronic device and/or with the third electronic device. These processes bring certain advantages to operation, as is described herein. With the foregoing in mind, a general description of suitable electronic devices that may include such a transceiver is provided below.

Figure 1:
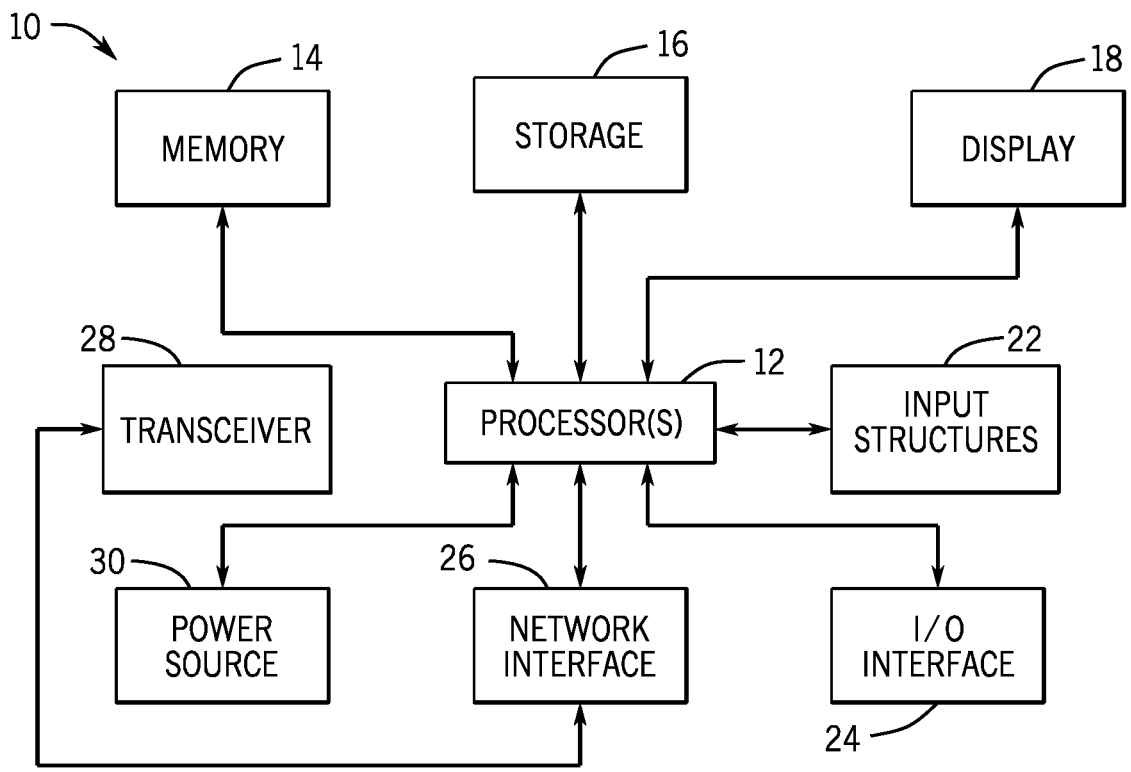
FIG. 1 is a schematic block diagram of an electronic device including a transceiver, in accordance with an embodiment.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. The one or more processors 12 may include one or more baseband processors that manage wireless communication and/or radio functions, and, in some embodiments, may at least partially be disposed in the network interface 26, the transceiver 28, and/or one or more modems. It should be noted that FIG. 1 is merely one example of a particular embodiment and is intended to illustrate the types of elements that may be present in the electronic device 10.

Figure 2:
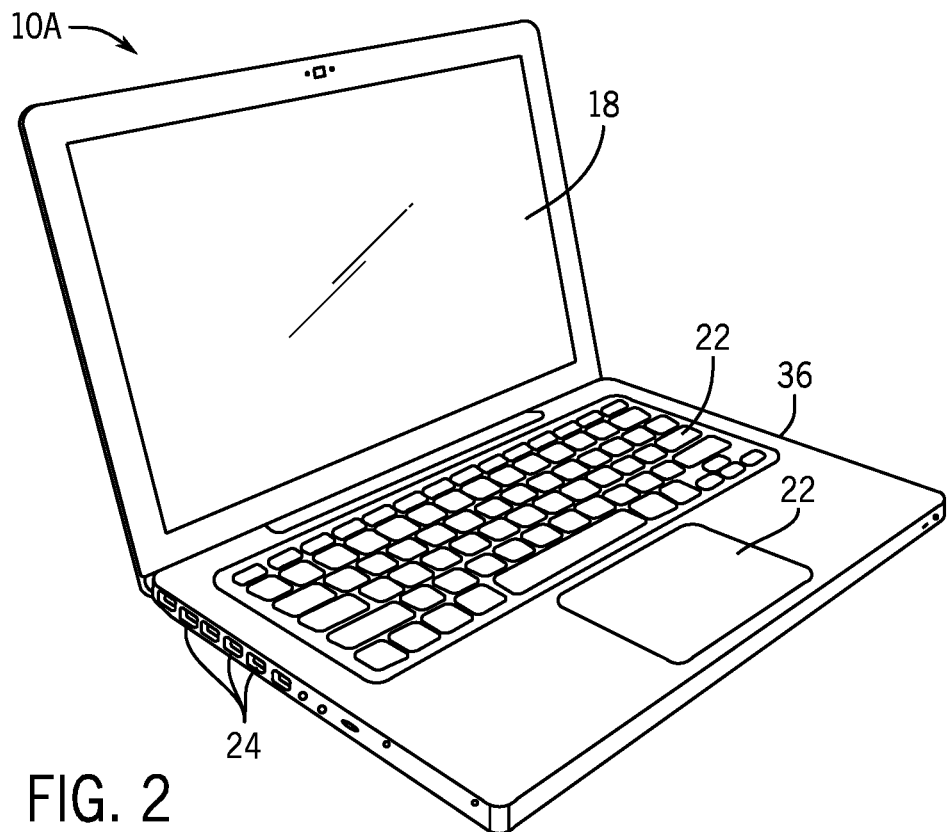
FIG. 2 is a perspective view of a notebook computer representing a first embodiment of the electronic device of FIG. 1.
Figure 4:
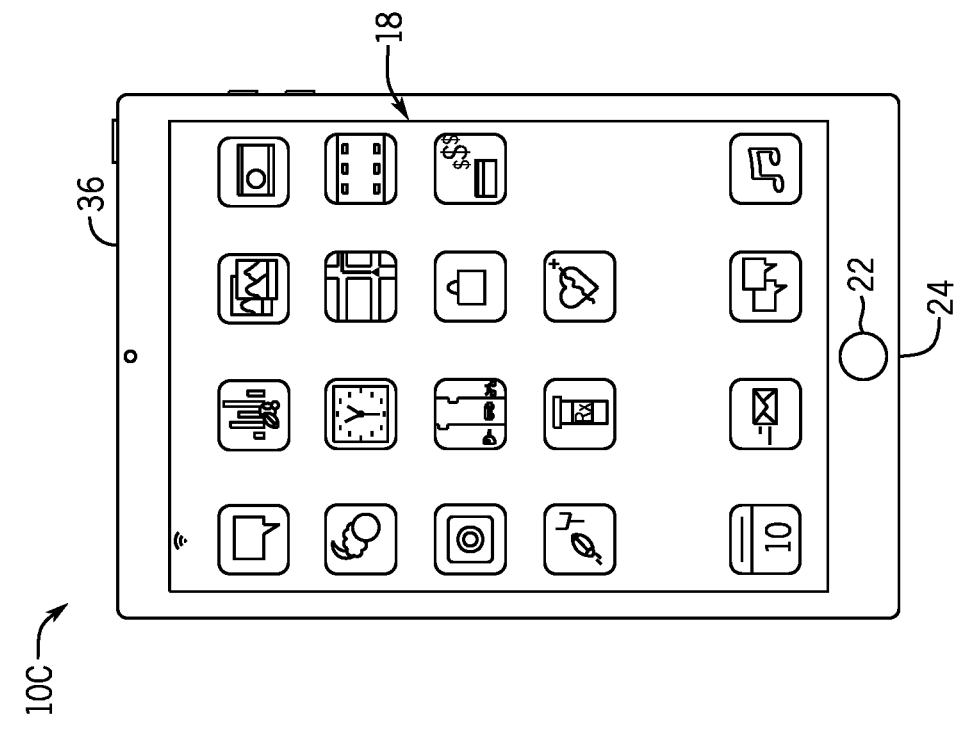
FIG. 4 is a front view of another handheld device representing a third embodiment of the electronic device of FIG. 1.
Figure 3:
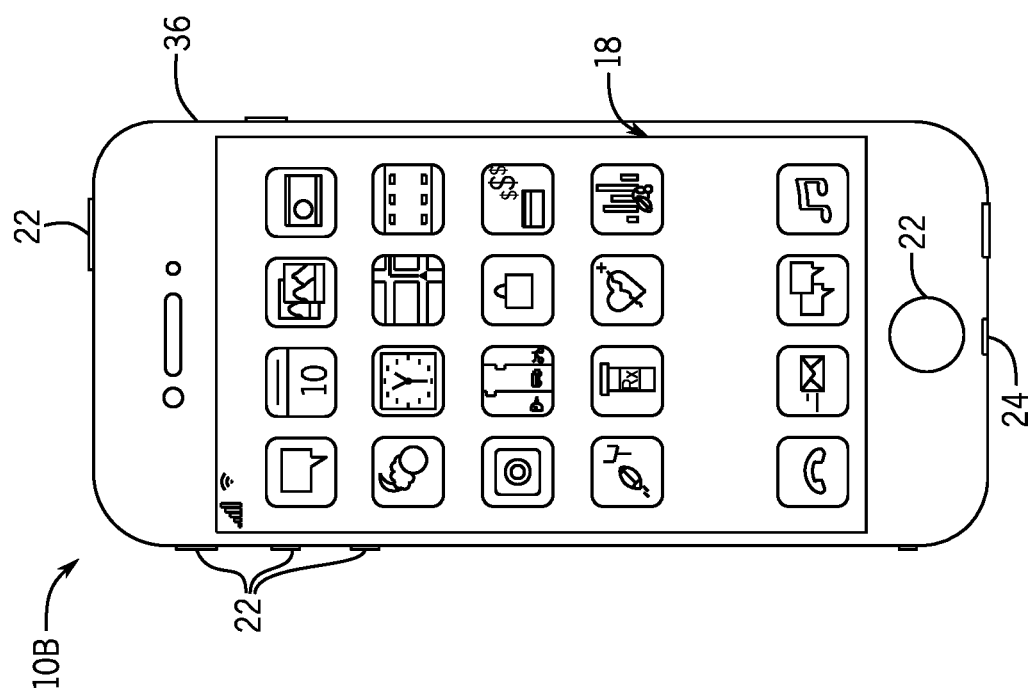
FIG. 3 is a front view of a handheld device representing a second embodiment of the electronic device of FIG. 1.
Figure 5:
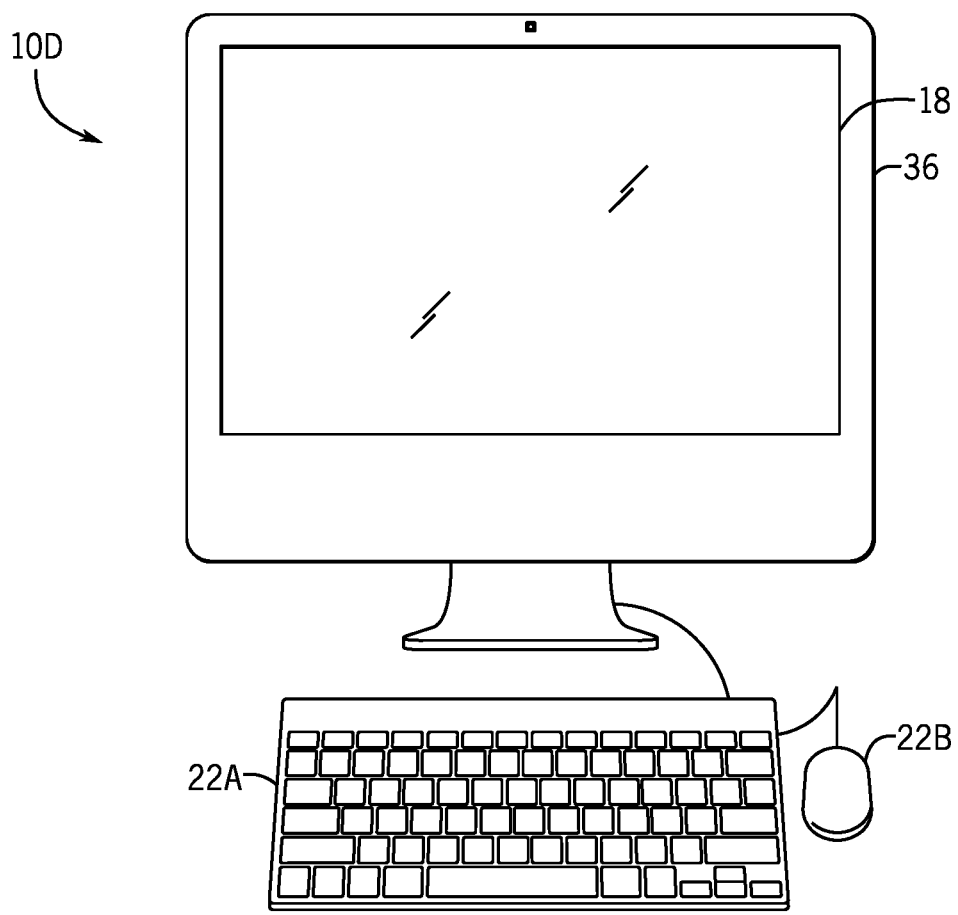
FIG. 5 is a front view of a desktop computer representing a fourth embodiment of the electronic device of FIG. 1.
Figure 6:
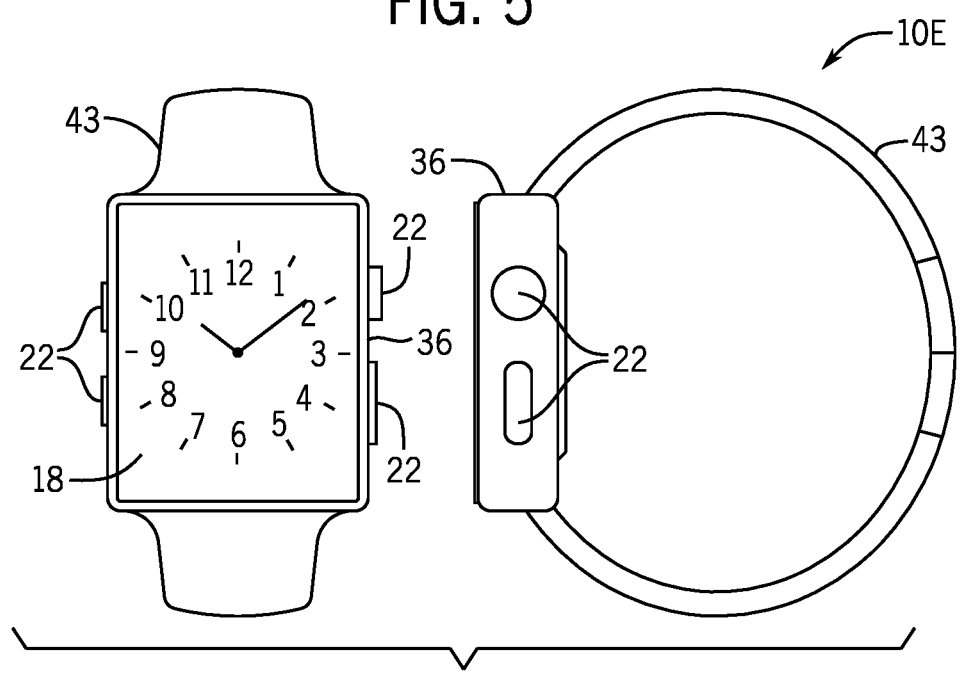
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, long term evolution (LTE®) cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. As discussed above, the network interface 26 may include one or more processors 12, such as one or more baseband processors, that manage wireless communication and/or radio functions.

In some embodiments, the electronic device 10 communicates over the aforementioned wireless networks (e.g., WI-FI®, WIMAX®, mobile WIMAX®, 4G, LTE®, 5G, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 30. The power source 30 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

Figure 7:
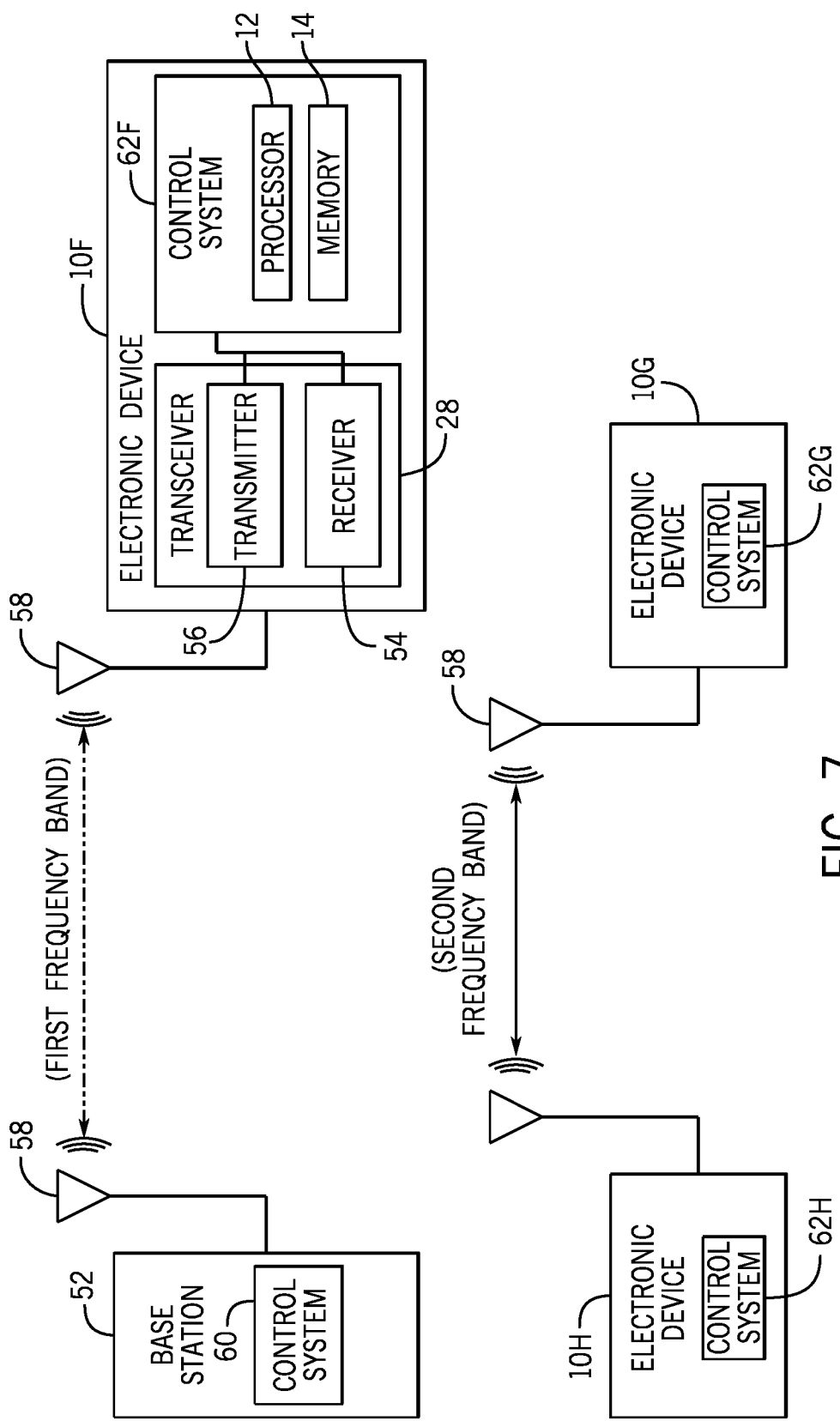
FIG. 7 is a block diagram of a base station communicating with the electronic device of FIG. 1, and of additional electronic device communicating with another electronic device, in accordance with an embodiment.

In certain embodiments, as previously noted above, each embodiment (e.g., notebook computer 10A, handheld device 10B, handheld device 10C, computer 10D, and wearable electronic device 10E) of the electronic device 10 may include the transceiver 28. With the foregoing in mind, FIG. 7 is a block diagram of a radio frequency (RF) network provided via a base station 52 communicating with a first electronic device 10F and a second electronic device 10G (e.g., NR communications), where the second electronic device 120G may communicate using device-to-device communications (e.g., UWB communications) with a third electronic device 10H, according to embodiments of the present disclosure. The electronic devices 10 (e.g., electronic device 10F, electronic device 10G, electronic device 10H) may each have the transceiver 28 that includes circuitry for a receiver 54 and for a transmitter 56. In the illustrated embodiment, the electronic device 10F includes the receiver 54 and the transmitter 56 in the transceiver 28. However, it is noted that an electronic device 10 may include the receiver 54 and the transmitter 56 as separate from the transceiver 28, and thus not include the transceiver 28. Further, the various functional blocks shown in FIG. 7 may include hardware elements (including circuitry), software elements (including computer code stored on a computer-readable medium) or a combination of both hardware and software elements. It should also be noted that FIG. 7 is merely one example of a particular implementation and is intended to illustrate the types of components that may be present. As such, functional blocks may be added or omitted, and their arrangement within the RF network and/or the electronic devices 10 may be modified. It is also noted that, although the depicted example includes one base station 52 communicatively coupled to electronic device 10F, and the electronic device 10G communicatively coupled to the electronic device 10H and/or the electronic device 10F, this is one example arrangement and other arrangements may be permissible. For example, in some embodiments, electronic device 10G and electronic device 10F may be a same electronic device 10 communicating with the electronic device 10H and/or additional electronic devices 10 may communicate with the electronic device 10G using device-to-device communications.

The electronic devices 10 may each include a cell phone (or other user equipment) that communicates with other electronic devices and/or a radio frequency (RF) network provider via the RF network. The electronic devices 10 may communicate over the RF network using data packets transmitted to and/or received from the base station 52. Each electronic device 10 may include a subscriber identification module (SIM) card that enables registration to the RF network provider. For example, information stored on the SIM card may be used for encryption and/or decryption operations of data packets transmitted between the base station and a respective electronic device 10, where the base station 52 may use a proprietary encryption or decryption method similar to other base stations of the RF network provider and used by the electronic device 10 via the SIM card. Each base station 52 may include an electronic system or device (e.g., similar to electronic device 10), and thus may include memory 14, displays 18, processors 12, I/O interfaces 24, network interfaces 26, transceivers 28, or the like (e.g., as shown in FIG. 1), for performing processing operations associated with maintaining the RF network and for communicating with one or more electronic devices 10. Furthermore, the base station 52 may include one or more systems that enable parallel operations. For example, the base station 52 may include duplicated transceiver 28 systems to permit parallel operations (e.g., to enable communications from different electronic devices 10 to be received at least partially at the same time)

The base station 52 may use different transmission frequencies or frequency bands when exchanging data with the electronic devices 10 via the RF network. Examples of the RF network may include Global System for Mobile Communications (GSM) radio access networks (GRAN, GERAN), Universal Mobile Telecommunications Service (UMTS) radio access networks (UTRAN), and Long Term Evolution (LTE®) radio access networks (E-UTRAN), and New Radio (NR). In some cases, the base station 52 may receive preferred transmission bands from the electronic device 10 and may select a transmission frequency or band from the preferred transmission bands, which may include one or more frequencies as part of a frequency range. The electronic device 10 may, in turn, receive the transmission frequency or band from the base station 52 and use the transmission frequency or band in communicating with the radio access network. In some cases, the electronic device 10 may receive a transmission band from the base station 52 and select a transmission frequency from the transmission band.

Electronic devices 10 may communicate with base stations 52 to receive or transmit data (e.g., data packets, communications), such as data associated with receiving or transmitting a phone call, a text message, browsing the Internet, or the like. To do so, the receiver 54 of an electronic device 10 may receive an input signal from the base station 52 that may be processed and/or modified. The input signal may be wirelessly received via an antenna 58 operably connected to the receiver 54. The input signal may include data transmitted via a carrier waveform. The carrier waveform may be modulated to store the data, and thus data may be retrieved from the input signal for use by the electronic device 10.

In some cases, the electronic device 10 may generate data for transmission to the base station 52. The transmitter 56 may use similar but reverse modulation and amplification operations as the receiver 54 to transmit the generated data as an RF signal to the base station 52.

The receiver 54 and/or the transmitter 56 may include circuitry that processes the input signal. The receiver 54 may include a low noise power amplifier (LNA), an analog-to-digital converter (ADC), a baseband filter, or the like, to process the input signal. For example, a LNA may receive a relatively low-power signal from the antenna 58 and increase its magnitude without significantly increasing noise of the input signal, generating a modified input signal. The receiver 54 may sometimes regulate power supplied to the LNA according to average power tracking of the modified input signal or envelope tracking of the input signal. Signals output from the LNA or other circuitry of the receiver 54 may be transmitted to an ADC for additional processing. The ADC may use any suitable conversion method to convert the output into digital data usable by the electronic device 10. In some embodiments, a baseband filter may receive an output from the ADC and perform additional processing on the initial data recovered from the carrier waveform. The transmitter 56 may work in a similar but reverse fashion. For example, data to be transmitted to the base station 52 may be modulated onto a carrier signal, amplified for transmission to the base station 52, and received by the base station 52 for use.

Electronic devices 10 communicating with the base station 52 may use wireless RF signals transmitted at frequencies that fall within certain ranges of frequencies, referred to herein as frequency bands. Some communications of the electronic devices 10 may transmit on a frequency band that overlaps with another frequency band of another communication. For example, a first electronic device may communicate data according to a first communication type on a first band, and a second electronic device may communicate data according to a second communication type of a second frequency band, where the first frequency band and the second frequency band at least partially overlap (e.g., at least partially include the same frequencies in the range of frequencies of the frequency band). Since the frequency bands are at least partially overlapping, communicating using the first electronic device may interfere with communicating using the second electronic device, and/or vice versa. A control system 60 of the base station 52 and/or control systems 62 of the electronic devices 10 (e.g., control system 62F, control system 62G, control system 62H) may control data transmission operations to reduce a likelihood that a data transmission sent or received on a second frequency band (e.g., UWB frequency band) is interrupted by and/or missed due to communication sent or received on a first frequency band (e.g., NR frequency band).

Figure 8:
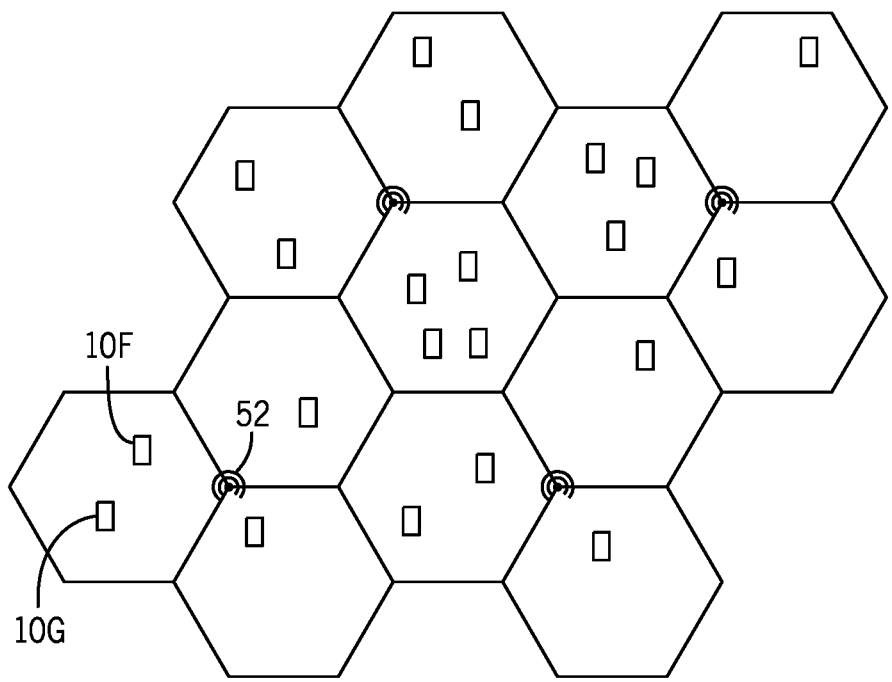
FIG. 8 is an illustrative diagram of multiple base stations, including the base station of FIG. 7, communicating with multiple electronic devices, including the electronic device of FIG. 1, in accordance with an embodiment.

To help illustrate, FIG. 8 depicts multiple base stations 52 and multiple electronic devices 10, including the electronic device 10F, communicating via an RF network according to a normal mode of operation (e.g., a non-muting operation, as will be appreciated herein with reference to FIGS. 10-24), according to embodiments of the present disclosure. When in the normal mode of operation, the base stations 52 and the electronic devices 10 may not communicate using at least partially overlapping frequency bands (e.g., the UWB frequencies).

The electronic devices 10 and/or the base stations 52 may communicate according to communication configurations that define periods of time during which types of communications are permitted to occur. Communication types may correspond to a type of originating application and/or service of the base station 52 and/or the electronic devices 10 and/or may correspond to a type of network through which the data is to be transmitted. For example, some electronic devices 10 may receive data from and/or transmit data to the base station 52 on a New Radio (NR) frequency band corresponding to RF network provider services (e.g., a first type of communication). Furthermore, some electronic devices 10 may transmit information generated by ultra-wideband services of the electronic devices 10 on an ultra-wideband (UWB) frequency band (e.g., a second type of communication). It is noted that for purposes of this disclosure, the NR frequency band may correspond to frequencies between 7 gigahertz (GHz) and 25 GHz (e.g., less than 25 GHz, greater than 7 GHz, between 7.125 GHz and 24.25 GHz) and/or the ultra-wideband (UWB) frequency band may correspond frequencies between 3 GHz and 11 GHz (e.g., between 3.1 GHz and 10.6 GHz, between 6.24 GHz and 8.736 GHz, between 3.55 GHz and 3.7 GHz). It should be understood that although the NR frequency band and the UWB frequency band are identified, any suitable frequency bands used by the electronic devices 10 and/or the base station 52 to communicate that also at least partially overlap may benefit from use of the systems and methods described herein.

Keeping the foregoing in mind, the electronic device 10G may transmit data to the electronic device 10F and/or the electronic device 10H during a duration of time indicated by the communication configuration to be a transmitting duration. While the electronic device 10G transmits data signals to another electronic device 10, the base station 52 may not transmit data signals (e.g., a muting operation). Communication configurations may indicate muting durations for the base station 52, and thus allocate a period of time for the electronic device 10F to communicate with the electronic device 10G. The cooperation enabled by the electronic devices 10 and/or base stations 52 mutually operating according to the communication configurations may reduce a likelihood that the data transmission from the electronic device 10G is interrupted by and/or missed due to a transmission by the base station 52 (e.g., reduces to zero or a relatively lower likelihood).

Figure 9:
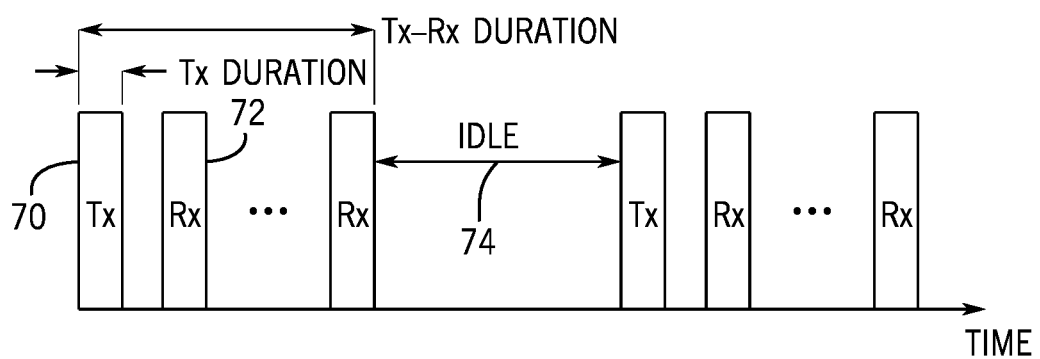
FIG. 9 is an example communication cycle diagram depicting transmission (TX) durations and receive (RX) durations arranged in a periodic pattern used to manage device-to-device communication between the electronic devices of FIG. 8, in accordance with an embodiment.

To elaborate, FIG. 9 is an example communication cycle diagram that visualizes a communication configuration of the electronic devices 10, such as the electronic device 10F, the electronic device 10H, and/or the electronic device 10G, for device-to-device communication, according to embodiments of the present disclosure. It should be noted that, for the purposes of this disclosure, device-to-device communication indicates direct communication between electronic devices 10 (e.g., such that an intermediary device, such as the base station 52, is not used). The communication configuration includes one or more transmission (TX) durations 70 and one or more receive (RX) durations 72. Idle durations 74 may be programmed between the TX durations 70 and the RX durations 72. The transmission and receiving operations of the electronic devices 10 (e.g., electronic device 10F, electronic device 10G, electronic device 10H) may be performed independent of uplink and downlink operations of the base station 52. That is, the control system 60 may operate RF transmission circuitry of the base station 52 (e.g., a transmitter 56, a receiver 54) to send or receive data to or from one or more of the electronic devices 10 during the idle durations 74.

In particular, the control system 62G may cause, for example, the electronic device 10F to receive data from the electronic device 10H during a respective RX duration 72 and/or may cause the electronic device 10G to transmit data to the electronic device 10H during a respective TX duration 70. Likewise, the control system 62G may cause the electronic device 10G to receive data from the electronic device 10H during a respective RX duration 72 and/or may cause the electronic device 10G to transmit data to the electronic device 10H during a respective TX duration. It is noted that in some cases, the TX durations 70 of the electronic device 10F may be offset in time from the RX durations 72 of the electronic device 10G. This may permit a transmitting electronic device 10 (e.g., electronic device 10F, electronic device 10G, electronic device 10H communicating on the UWB frequency band) to transmit data to a receiving electronic device 10. The electronic device 10F, the electronic device 10G, electronic device 10H, the base station 52, and/or each other described electronic device 10 and/or base station 52 may queue data to be transmitted via the RF network, such that data to be transmitted is not lost as the electronic devices 10 are transitioned in and out of the TX durations 70 and the RX durations 72.

As described above, the electronic device 10F may communicate with the base station 52 on a first frequency band (e.g., NR frequency band) while the electronic device 10F, the electronic device 10G, and/or the electronic device 10H communicates on a second frequency band (e.g., UWB frequency band). When the first frequency band does not overlap with the second frequency band, a likelihood of collision or interference due to transmissions to or from the base station 52 is negligible and communication performance is generally not impacted. However, when the first frequency band at least partially overlaps with the second frequency band, collisions may occur between data transmissions and/or communication interference may be present (e.g., a likelihood may increase of impacted wireless communications). For example, a power level of the signals used for NR-type communications may be greater than that used for UWB-type communications, and thus at least partially simultaneous transmission of the NR-type communications may interference with some ongoing UWB communications. It is noted that in some cases, the power level of the UWB-type communications may be large enough to interfere with at least partially simultaneous transmissions of NR-type communications.

The presently described systems, devices, and methods may address these shortcomings and enable increased and more flexible usage of overlapping frequency bands. In particular, as described herein, muting durations may be included within the communication configuration to reduce or eliminate collisions between transmissions on frequency bands that at least partially overlap. That is, the control system 60 of the base station 52 may adjust a muting configuration used to control when the base station 52 and/or the electronic devices 10 pauses communications on the first frequency band to permit communications on the second frequency band. For example, the muting configuration may include muting durations that define when the electronic device 10F is permitted to transmit data to the electronic device 10G and/or to the base station 52 using the first frequency band (e.g., is permitted to transmit communications of a first type) and when the electronic device 10F is permitted to transmit data to the electronic device 10G using the second frequency band (e.g., is permitted to transmit communications of a second type). The use of the muting configuration that includes muting durations may be considered a time-domain masking mechanism that permits temporary muting of uplink and downlink communications associated with the base station 52 and transmitted on the first frequency band, thereby temporarily reducing amounts of interference (e.g., levels of interference) experienced by electronic devices 10 transmitting data between each other on the second frequency band.

Figure 10:
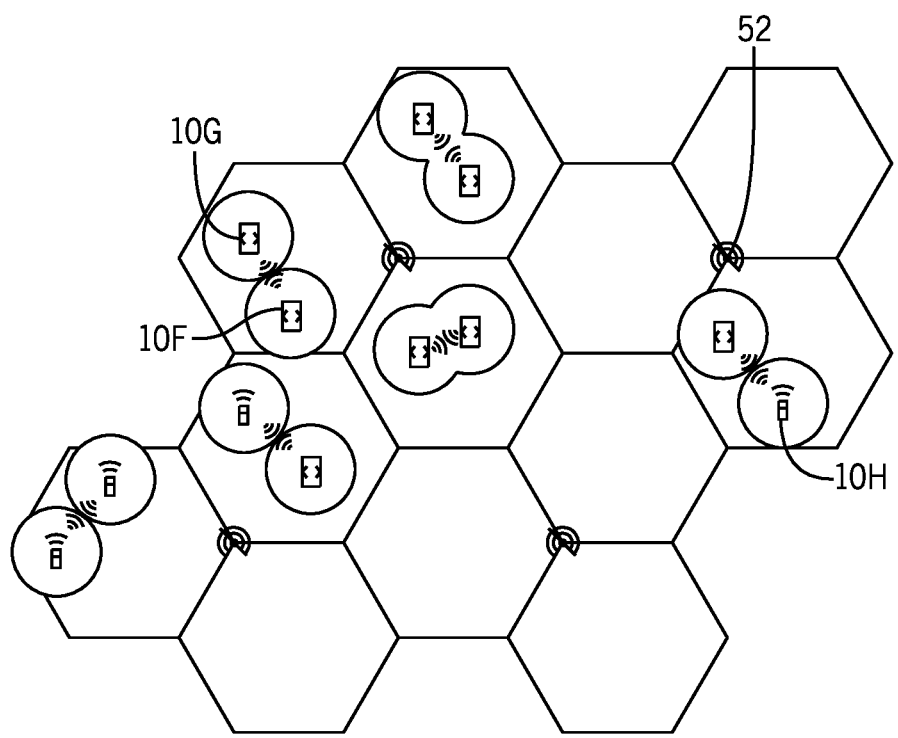
FIG. 10 is an illustrative diagram of the multiple base stations communicating with the multiple electronic devices, including the electronic device of FIG. 1, where the multiple base stations and the multiple electronic devices are operated according to a static communication configuration during a muting duration, in accordance with an embodiment.

To help explain, FIG. 10 is an illustrative diagram of the multiple base stations 52 communicating with a subset of electronic devices 10 operating according to a static communication configuration during a muting duration, according to embodiments of the present disclosure. The communication configuration may be referred to as "static" because the configuration may be fixed and not dynamically changed. The control system 60 and/or the control systems 62 may reference the static communication configuration when operating RF circuitry to permit communications between the electronic devices 10 and the base station 52. FIG. 10 shows each base station 52 as muted during muting durations of a communication configuration. Thus, each control system 60 of the base stations 52 of FIG. 10 may operate in a muting mode of operation during a muting duration, such that the base stations 52 do not send or receive data.

When the control system 60 operates one of the base stations 52 in the muting mode of operation, such that communications of a first type (e.g., NR communications) are paused or otherwise stopped, interference between communications of the first type and between communications of a second type (e.g., UWB communications) may be reduced. Thus, a quality of information transmitted between electronic devices 10 on the second frequency band (e.g., communications of the second type, UWB communications) may improve. It is noted that these system and methods described herein may also apply to electronic devices 10 that are non-smartphone devices capable of communicating on the first frequency band and/or the second frequency band (e.g., UWB-capable devices), such as electronic device 10H. For example, the electronic device 10H may include a keychain device, a vehicle sensor, a smart thermostat device, a printer device, a smart watch (e.g., electronic device 10E), or the like. When the electronic device 10H is a keychain device, such as a vehicle key fob, an operator of the electronic device 10H may use close-range communications to authenticate with another electronic device 10, such as using a key fob for keyless car entry. When the electronic device 10H is a smart thermostat device, a vehicle sensor, a printer device, or the like, the electronic device 10H may communicate with another electronic device 10 to transmit or receive sensed data and/or to transmit or receive files for use (e.g., to print). These are each examples of device-to-device communications that may use a UWB frequency band. Thus, the systems and methods described herein may improve communications between two or more non-smartphone devices, between two or more smartphone devices (e.g., electronic device 10G, electronic device 10F), between one or more smartphone devices and one or more non-smartphone devices, or the like, by reducing interference that affects the device-to-device communications.

Figure 11:
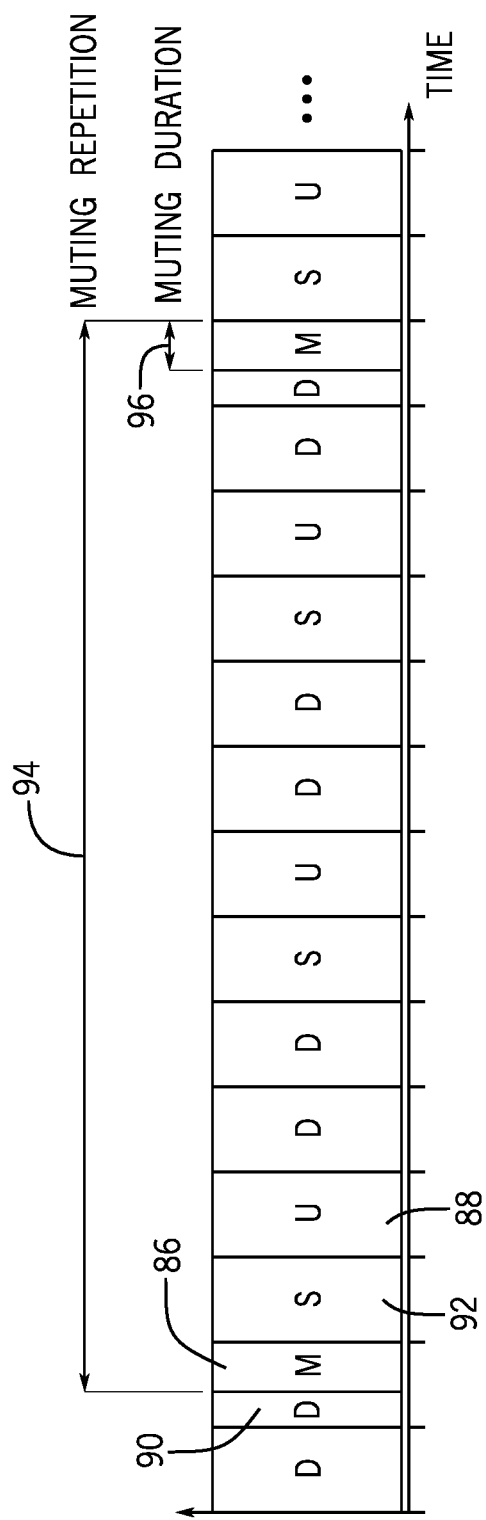
FIG. 11 is an example communication cycle diagram depicting a static communication configuration that includes muting durations, uplink durations, downlink durations, and special durations (e.g., combined uplink duration and downlink duration) arranged in a periodic pattern used to manage communication exchange between the electronic device of FIG. 1, the additional electronic devices of FIG. 7, and the base station of FIG. 7, in accordance with an embodiment.

FIG. 11 is an example communication cycle diagram depicting a communication configuration, according to embodiments of the present disclosure. FIG. 11 illustrates the muting durations 86 that cause the control system 60 to operate the base station 52 in a muting mode of operation and/or that cause the control system 62 to operate the electronic device 10 into the muting mode of operation. The communication configuration includes time slots corresponding to muting durations 86, uplink durations 88, downlink durations 90, and special durations 92 (e.g., combined uplink duration and downlink duration) arranged in a periodic pattern used to manage communication exchange between the electronic devices and the base station 52.

These time slots are referred to herein as durations and may be interpreted a data construct that indicates to the control system 60 and/or the control system 62 which mode of operation to operate the base station 52 and/or the electronic device 10 and for how long. In this way, each duration may correspond to a different file header, title, indication, instruction, or the like, interpreted by the control system 60 and/or the control system 62 as the mode of operation. The control system 60 and/or the control system 62 may determine a subsequent or next indicated duration while operating the base station 52 and/or the electronic device 10 in a current indicated duration to prepare for upcoming operations. This determination is described with reference to at least FIGS. 12 and 13 herein.

The muting duration 86 may correspond to a time period (e.g., a duration of time) in which the base station 52 and/or the electronic device 10 are operated to pause or stop communications of the first type (e.g., base station-to-electronic device communications, NR-type communications) to permit a time period for transmission and/or reception of communications of the second type (e.g., device-to-device communications, electronic device-to-electronic device communications, UWB-type communications). In this way, downlink operations and uplink operations may stop and/or may be paused during the muting duration 86. The uplink duration 88 may correspond to a time period used by the control systems 62 to operate the electronic device 10 to transmit communications of the first type to the base station 52 and may correspond to a time period used by the control system 60 to operate the base station 52 to receive the communications of the first type transmitted from the electronic device 10. The downlink durations 90 may correspond a time period used by the control system 60 to operate the base station 52 to transmit communications of the first type to the electronic devices 10 and may correspond to a time period used by the control systems 62 to operate the electronic device 10 to receive the communications of the first type transmitted from the base station 52. The special duration 92 may correspond to a time period used by the control system 60 and/or the control systems 62 to transmit or receive communications to or from the control system 60 and/or the control systems 62.

The muting configuration may describe a periodic operating characteristic of the muting mode of operation by including a definition for a muting repetition parameter (visualized relative to time at duration 94). The muting repetition parameter may define how often the muting durations 86 repeat in the communication configuration. The muting repetition may be defined as to start at a starting edge of a first muting duration (e.g., first muting allocation) and end at an ending edge of a next muting duration (e.g., subsequent and second muting allocation). In some cases, the muting repetition may be defined at a starting or ending edge of a first muting duration and end at the same of the next muting duration (i.e., a starting edge of a first muting duration paired with a starting edge of a second muting duration, ending edge of a first muting duration paired with an ending edge of a second muting duration). The muting configuration may also include a definition for a muting duration parameter (visualized relative to time at duration 96). The muting duration parameter may correspond to a depicted width of the muting duration 86 and define a period of time during which the control system 60 and/or the control system 62 is to mute communications of the first type.

In this depicted case, each of the base stations 52 may receive the muting configuration from the RF network provider (e.g., from a core network device managed and/or operated by the RF network provider) and/or may generate the muting configuration. FIG. 10 and FIG. 11 may correspond to a static muting configuration example, where each base station 52 associated with an RF network receives a same muting configuration that does not change over time. It is noted that FIG. 11 illustrates how the muting durations 86 are constant durations of time over time. In this way, the base stations 52 may receive a first static muting configuration and may transmit the static muting configuration to the electronic devices 10 for implementation in communication operations.

The electronic devices 10 may receive the muting configurations from the network as a configuration commonly broadcast to all users, such as the system information block (SIB) or another information element (IE) which may be transmitted to all user equipment communicating (e.g., camped) on a cell, and apply the muting configurations to respective control systems 62. The control system 62 may reference the broadcast configuration (e.g., the SIB) and the stored muting configuration when operating systems of the electronic device 10 to communicate. The SIB and/or the control system 62 may automatically convert the muting configuration into a communication configuration.

In the cases where the electronic device 10 communicates on a restricted bandwidth (e.g., some non-smartphone electronic devices 10), the SIB may also be restricted in bandwidth. To accommodate this, the electronic device 10 may receive a synchronization message characterized by a transmission parameter from the base station 52. The electronic device 10 (more particularly, the control system 62) may adjust the transceiver 28 based at least in part on the transmission parameter in response to receiving the synchronization message. The transmission parameter may indicate a center frequency and/or bandwidth. After the transceiver 28 is calibrated based on the synchronization message, the electronic device 10 may receive the muting configuration. In some embodiments, the transceiver 28 is tuned based on the transmission parameter, such as tuned based on the bandwidth to select a center frequency determined to be relatively better performing for a particular communication.

Figure 12:
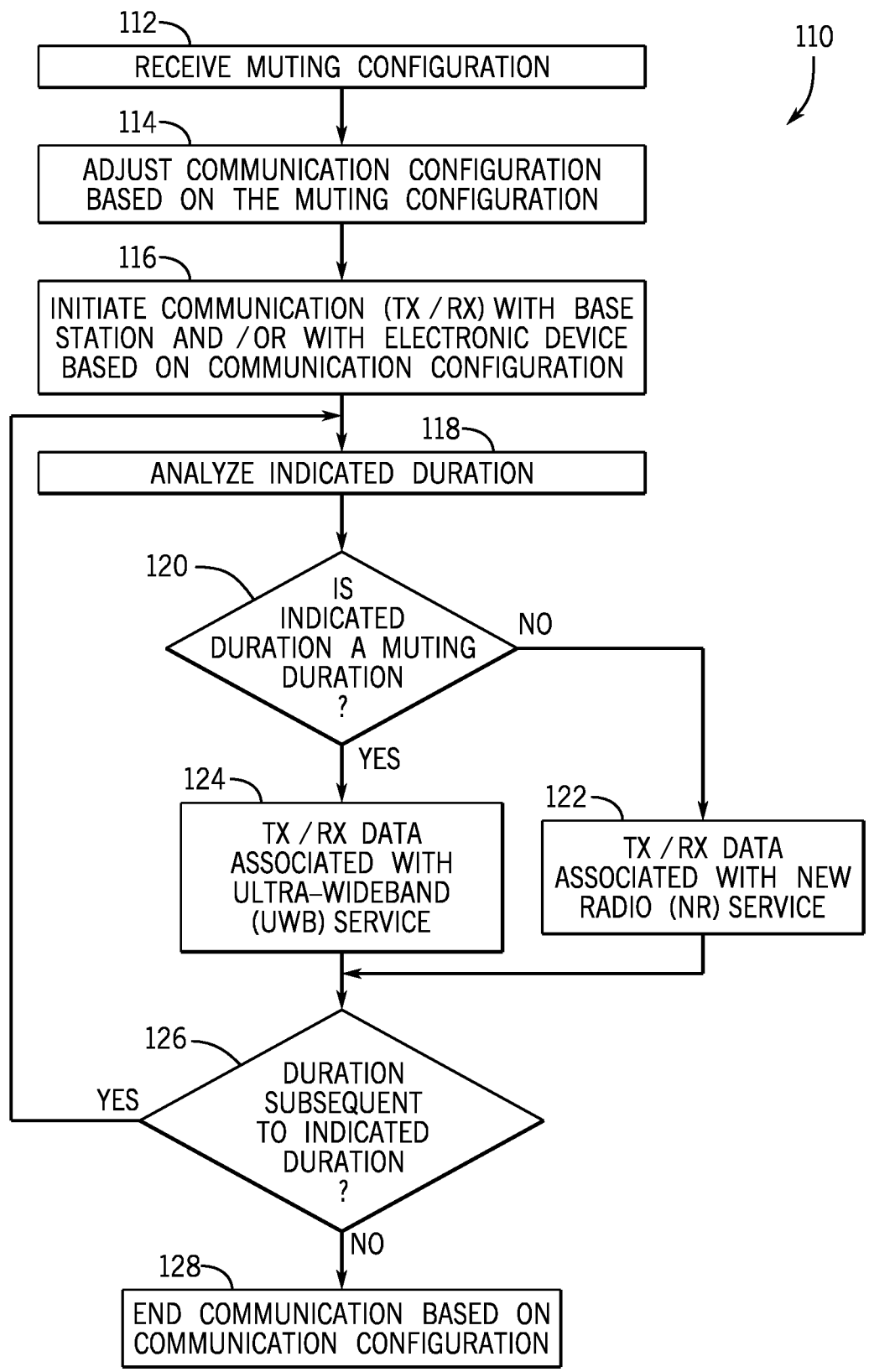
FIG. 12 is a flow chart illustrating a method for operating the electronic device of FIG. 1 as a first electronic device according to the communication configuration of FIG. 11 to communicate with the additional electronic devices of FIG. 7 and/or the base station of FIG. 7, in accordance with an embodiment.

Turning now to describe operation of the electronic device 10G according to the muting configuration, FIG. 12 is a flow chart illustrating a method 110 for operating the electronic device 10F to communicate with other electronic devices 10 (e.g., electronic device 10G, electronic device 10H, or the like) and/or the base station 52 according to a muting configuration, according to embodiments of the present disclosure. In some embodiments, the method 110 may be implemented at least in part by executing instructions stored in a tangible, non-transitory, computer-readable medium, such as the memory 14, using processing circuitry, such as processors 12 (including one or more baseband processors), or the like. As described herein, the method 110 is described as being performed by the electronic device 10F. However, it is noted that any suitable electronic device 10, control system 62, or other suitable processing circuitry may perform the method 110. It is noted that although depicted and/or described in a particular order, many operations described herein may be performed in any suitable order, and some operations may be skipped altogether. Furthermore, it is noted that the control system 62F may perform at least a subset of the operations of the method 110 on behalf of the electronic device 10F to permit the electronic device 10F to perform the method 110.

Keeping this in mind, at block 112, the electronic device 10F may receive a muting configuration from the base station 52. The base station 52 may generate the muting configuration based on parameters received from an RF network provider, where the parameters may define a muting repetition parameter and a muting duration parameter. In some cases, the muting configuration may also include indications of a repetition pattern of downlink durations 90, a repetition pattern of uplink durations 88, a repetition pattern of special durations 92, a total length of time to use the muting configuration, or the like, to further define wireless communications over the RF network. The electronic devices 10 may receive the muting configuration from the base station 52 via a radio resource control (RRC) reconfiguration operation, medium access control (MAC) control element (CE), physical layer signaling, or any combination thereof.

At block 114, the electronic device 10F may adjust its communication configuration based at least in part on the muting configuration. In this way, the electronic device 10F may adjust its wireless communication operations to be in accordance with the muting configuration transmitted from the base station 52, and thus in accordance with any standards communicated to the base station 52 by the RF network provider. As described above, the communication configuration may be depicted in FIG. 11, and thus define time periods during which the electronic device 10F may uplink data to the base station 52, time periods during which the electronic device 10F may downlink data from the base station 52, time periods during which the electronic device 10F may transmit data to the electronic device 10G, and/or time periods during which the electronic device 10F may receive data from the electronic device 10G.

At block 116, the electronic device 10F may initiate communication operations based at least in part on the communication configuration. These communication operations may permit the electronic device 10F to communicate with the base station 52 and/or the electronic device 10G. Initiation of communication operations may include the electronic device 10F powering-on and/or initializing RF circuitry (e.g., transmitter 56, receiver 54, transceiver 28). Initializing RF circuitry may include performing a calibration operation to prepare circuitry for use and/or may include performing a tuning operation to identify gains to use or other transmission parameters to permit communication with nearby base stations 52 and/or electronic devices 10.

To distinguish between the time periods indicated by the communication configuration, the electronic device 10F, at block 118, may analyze an indicated duration to determine which time period is upcoming. In this way, the electronic device 10F may preemptively analyze the communication configuration to determine which time period is going to be next. The electronic device 10F may analyze an indicated duration a period of time suitably early to provide enough time to prepare (e.g., configure) the RF circuitry for the upcoming operation that corresponds to a configuration time of the RF circuitry. For example, during a current duration, the electronic device 10F may transmit data and the indicated duration (e.g., a next duration of the communication configuration subsequent to the current duration that is ongoing) may direct the electronic device 10F to receive data. Thus, the electronic device 10F may configure the receiver 54 in response to identifying the indicated duration as a receiving duration such that when the indicated duration is the next current duration, the electronic device 10 is already prepared to receive data.

As a result of the analysis, the electronic device 10F, at block 120, may determine whether the indicated duration is a muting duration 86. A file header, a title, a designator, or the like, may be included in the communication configuration to indicate that a time period represented by the communication configuration corresponds to a muting duration 86.

When the electronic device 10F determines that the indicated duration does not correspond to a muting duration 86, the electronic device 10F, at block 122, may transmit or receive data (e.g., data packet, packet) associated with a first frequency band, such as a NR frequency band and/or a NR service that generates data to be transmitted via the NR frequency band. The electronic device 10F may transmit data when the indicated duration permits the electronic device 10F to uplink data to the base station 52 and may receive data when the indicated duration permits the electronic device 10F to downlink data from the base station 52.

Returning to block 120, when the electronic device 10F determines that the indicated duration does correspond to a muting duration 86, the electronic device 10F, at block 124, may transmit or receive data (e.g., data packet, packet) associated with a second frequency band, such as an UWB frequency band and/or an UWB service that generates data to be transmitted via the UWB frequency band. Identification of the muting duration 86 may cause the electronic device 10F to transmit data to and/or receive data from the other electronic devices 10 (e.g., electronic device 10G, electronic device 10H) using the second frequency band. While the muting duration 86 is ongoing, communications of the first type (e.g., communications on the first frequency band) may be stopped and/or paused to reduce an amount of interference affecting communications between electronic devices 10.

At block 126, the electronic device 10F may determine whether the communication configuration includes a next duration (e.g., an indicated duration subsequent to the current indicated duration). When the communication configuration does not include a subsequent duration, at block 128, the electronic device 10F may stop or pause wireless communications with the electronic device 10G and/or the base station 52. In some cases, however, the electronic device 10F will continue to, at block 118, determine a type of indicated duration for the next duration, and then operate accordingly based on whether the electronic device 10F, at block 120, determines that the newly indicated duration corresponds to a muting duration 86.

Figure 13:
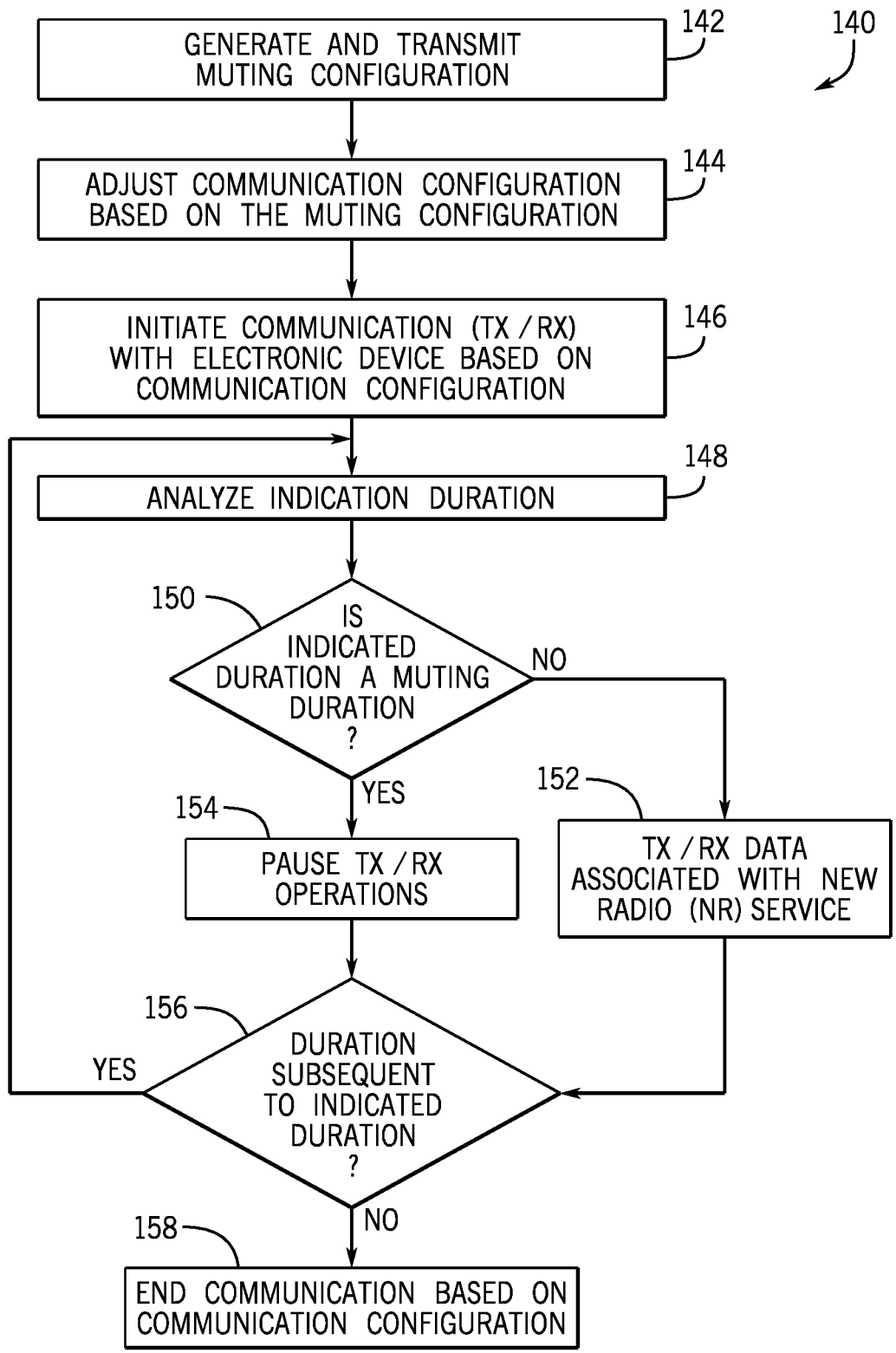
FIG. 13 is a flow chart illustrating a method for operating the base station of FIG. 7 according to the communication configuration of FIG. 11 to communicate with the electronic device of FIG. 1, in accordance with an embodiment.

Operations of the electronic device 10F may complement operations of the base station 52. FIG. 13 is a flow chart illustrating a method 140 for operating the base station 52 to communicate with the electronic device 10F according to a muting configuration, according to embodiments of the present disclosure. In some embodiments, the method 140 may be implemented at least in part by executing instructions stored in a tangible, non-transitory, computer-readable medium, such as the memory 14, using processing circuitry, such as processors 12 (including one or more baseband processors), or the like. However, as described herein, the method 140 is described as being performed by the base station 52 and it is noted that any suitable electronic device 10, control system 60, or other suitable processing circuitry may perform the method 140. It is noted that although depicted and/or described in a particular order, many operations described herein may be performed in any suitable order, and some operations may be skipped altogether. It is noted that the control system 60 may perform at least a subset of the operations of the method 140 on behalf of the base station 52 to permit the base station 52 to perform the method 140.

Keeping this in mind, at block 142, the base station 52 may generate and/or transmit a muting configuration to the electronic device 10F. In some cases, the base station 52 may transmit the muting configuration to the electronic device 10G and/or electronic device 10H involved in device-to-device communications. It is noted that as described herein, the base station 52 may transmit or receive data from one or more electronic devices 10 registered to its RF network and/or its RF network provider. In this way, the base station 52 may perform the method 140 to manage communication operations corresponding to each registered electronic device 10. However, for ease of discussion, the base station 52 is discussed as performing the method 140 to communicate with the electronic device 10F even though the method 140 is suitably applied to permit the base station 52 to communicate with other electronic devices 10.

The base station 52 may generate the muting configuration based on parameters received from its RF network provider, where the parameters may define a muting repetition parameter, a muting duration parameter. In some cases, the muting configuration may also include indications of a repetition pattern of downlink durations 90, a repetition pattern of uplink durations 88, a repetition pattern of special durations 92, a total length of time to use the muting configuration, or the like, to further define wireless communications over the RF network.

At block 144, the base station 52 may adjust its communication configuration based at least in part on the muting configuration. In this way, the base station 52 may adjust its wireless communication operations to be in accordance with the muting configuration. As described above, the communication configuration may be depicted in FIG. 11 and thus define time periods during which, for example, the electronic device 10F may uplink data to the base station 52, time periods during which the electronic device 10F may downlink data from the base station 52, time periods during which the electronic device 10F may transmit data to the electronic device 10G, and/or time periods during which the electronic device 10F may receive data from the electronic device 10G, and the like.

At block 146, the base station 52 may initiate communication operations based at least in part on the communication configuration. These communication operations may permit the base station 52 to communicate with other base stations 52 and electronic devices 10. Initiation of communication operations may include the base station 52 powering-on or initializing its RF circuitry (e.g., transmitter 56, receiver 54, transceiver 28). Initializing RF circuitry may include performing a calibration operation to prepare circuitry for use and/or may include performing a tuning operation to identify gains to use or other transmission parameters to permit communication with nearby base stations 52 and/or electronic devices 10.

To distinguish between the time periods indicated by the communication configuration, the base station 52, at block 148, may analyze an indicated duration. In this way, the base station 52 may preemptively analyze the communication configuration to determine which operation mode to use next. The base station 52 may analyze an indicated duration a period of time suitably early to provide enough time to configure the RF circuitry for the upcoming operation. The period of time may correspond to at least an amount of time used to configure the RF circuitry. For example, during a current duration, the base station 52 may transmit data and may analyze the indicated duration (e.g., a next indicated duration of the communication configuration subsequent to the current duration that is ongoing) to determine that the communication configuration is going to direct the base station 52 to receive data next. Thus, the base station 52 may configure its receiver 54 in response to identifying the indicated duration as a receiving duration (e.g., the uplink duration 88). That way, when the indicated duration is the new current duration, the base station 52 is already prepared to uplink data from the electronic devices 10.

As a result of the analysis, the base station 52, at block 150, may determine whether the indicated duration is a muting duration 86. A file header, a title, a designator, or the like, may be included in the communication configuration to indicate that a time period represented by the communication configuration corresponds to a muting duration 86.

When the base station 52 determines that the indicated duration does not correspond to a muting duration 86, the electronic device 10F, at block 152, may transmit or receive data (e.g., data packet, packet) associated with a first frequency band, such as a NR frequency band and/or a NR service that generates data to be transmitted via the NR frequency band. The base station 52 may transmit data when the indicated duration permits the base station 52 to downlink data to the electronic device 10F and may receive data when the indicated duration permits the base station 52 to uplink data from the electronic device 10F.

Returning to block 150, when the base station 52 determines that the indicated duration corresponds to a muting duration 86, the base station 52 may, at block 154, stop and/or pause communications of the first type (e.g., communications to be transmitted on the first frequency band, NR-type communications). When the base station 52 pauses transmitting data on the first frequency band, the electronic devices 10 may communicate data on the second frequency band, such as the UWB frequency band and/or the UWB service that generates data to be transmitted via the UWB frequency band. While the muting duration 86 is ongoing, communications of the first type may be stopped and/or paused to reduce an amount of interference affecting communications between electronic devices 10.

At block 156, the base station 52 may determine whether the communication configuration includes a next duration (e.g., an indicated duration subsequent to the indicated duration and/or the current duration). When the communication configuration does not include a subsequent duration, at block 158, the base station 52 may stop or pause wireless communications with one or more of the electronic devices 10. In some cases, however, base station 52 continues to, at block 148, determine a type of indicated duration for the next duration, and then operate accordingly based on whether the base station 52, at block 150, determines that the next indicated duration corresponds to a muting duration 86.

In some embodiments, the base station 52 may adjust the muting configuration over time, such that the muting configuration is not a static muting configuration. For example, the base station 52 may be adjusted based on a traffic profile indicating an expected load (e.g., a number of electronic devices 10 expected to be communicatively coupled to one or more base stations at future time), a traffic profile indicating a size of a current load (e.g., a number of electronic devices 10 communicatively coupled to one or more base stations at a current time), a traffic profile indicating properties of a current load (e.g., characteristics of one or more electronic devices 10 communicatively coupled to one or more base stations at a current time, average characteristics of one or more electronic devices 10 communicatively coupled to one or more base stations at a current time), or the like. When adjusting the muting configuration overtime, the base station 52 may use a muting configuration for a first subset of electronic devices 10 that is different from a muting configuration for a second subset of electronic devices 10. Furthermore, in some cases, a common muting configuration is used in addition to subset-specific and/or device-specific muting configurations, where the common muting configuration may be considered a default muting configuration. These systems and methods are described herein with reference to FIGS. 15-24 to clarify on these examples. It is noted that these examples described below may be used additionally to or alternatively to the systems and methods described above.

Figure 14:
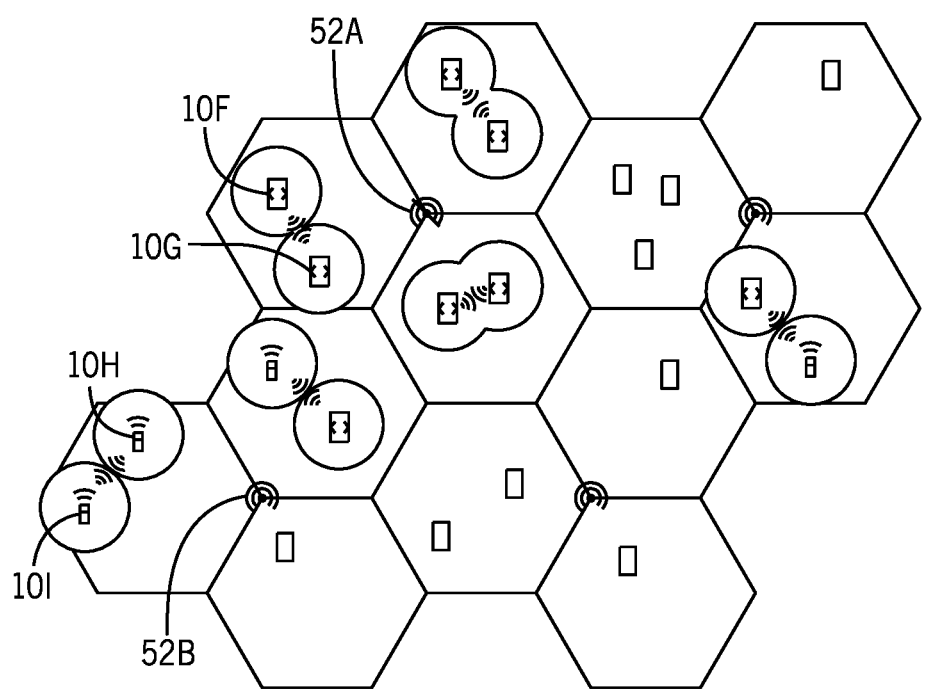
FIG. 14 is an illustrative diagram of multiple base stations communicating with multiple electronic devices, including the electronic device of FIG. 1, the additional electronic devices of FIG. 7, and the base station of FIG. 7, where the multiple base stations and the multiple electronic devices are operated according to a dynamic communication configuration during a muting duration, in accordance with an embodiment.

To help explain, FIG. 14 is an illustrative diagram of the multiple base stations 52 communicating with the multiple electronic devices 10, including the electronic device 10F, the electronic device 10G, the electronic device 10H, and the base station 52, according to a dynamic communication configuration during a muting duration, according to embodiments of the present disclosure. The base stations 52 of FIG. 14 may receive different muting configurations and/or may generate different communication configurations based on receiving the same muting configuration. In particular, the base stations 52 may generate the different communication configurations using the same muting configuration from the RF network and/or the RF network provider based on different communication traffic profiles in respective geographical locations of the base stations 52. Operating according to these dynamically-generated muting configurations and/or dynamic communication configurations may permit a subset of the base stations 52 to continue to communicate using the first frequency even while a second subset of the base stations are muted.

For example, the communication configuration of a base station 52A may cause the base station 52A to pause or mute communications on a first frequency band while the communication configuration of a base station 52B may cause the base station 52B to continue communications on the first frequency band. When communication configurations and/or muting configurations are dynamic, a subset of the base stations 52 (e.g., subset including the base stations 52A) may be muted to reduce interference of device-to-device communications on a second frequency band at least partially overlapping the first frequency band, such as communications between electronic device 10F and the electronic device 10G. The base station 52B may determine based on the traffic profile that electronic device 10H and/or electronic device 10I are of suitable distance from the base station 52B to not be affected or to be negligibly affected by the communications on the first frequency band. Since communications of the base station 52B do not affect device-to-device communications of the electronic device 10H and/or electronic device 10I, the base station 52B may determine to not include muting durations within its communication configuration.

The traffic profile may indicate an expected load, a size of a current load, properties of a current load, expected properties of an expected load, or the like. The traffic profile may be generated by the base station 52 in response to signals and/nor communications received from the electronic devices 10. In some cases, the traffic profile may be transmitted to one or more of the base stations 52 from the RF network and/or the RF network provider. In some cases, however, the electronic devices 10 may transmit one or more traffic profiles to the base stations 52, such as traffic profiles indicating one or more properties of respective transceiver circuitry 28 of the electronic device 10 or indicating other suitable device assistance information indicative of a parameter associated with the receiver 54 and/or the transmitter 56.

The traffic profile may originate from a variety of sources. For example, a calendar application of the RF network provider and/or of a respective base station 52 may maintain a schedule of nearby events and/or public facilities to provide expected load information corresponding to upcoming events (e.g., events to be held at the physical facility). In this way, a base station 52 located a threshold distance from a football stadium may receive a traffic profile indicative of an expected load that corresponds to when a football game is expected to end. The base station 52, aware that device-to-device communications may increase after the football game ends, may proactively (e.g., preemptively) generate a communication configuration that increases or adjusts durations of the muting durations 86 to increase an overall length of time allocated to device-to-device communications (e.g., key fobs used to unlock car doors). Furthermore, the base station 52 may use a number of attendees indicated by the traffic profile to determine by a length of time to extend the muting durations 86 and/or for how long to repeat use of the adjusted muting durations 86 (e.g., when attendees have left from the stadium there may be no need to continue use of the adjusted muting durations 86 or muting durations 86 at all). In this way, the base station 52 may compare a number of attendees to historical numbers of attendees, and how suitable a past adjustment was for the historical numbers of attendees, to determine a suitable adjustment.

In some cases, the traffic profile may describe properties of the electronic devices 10 communicatively coupled to the base station 52. In these cases, the traffic profile may describe whether one or more electronic devices 10 support communication on the second, overlapping frequency band (e.g., UWB frequency band). Sometimes the traffic profile may describe a number of electronic devices 10 expected to use services corresponding to the second frequency band and/or a number of electronic devices 10 able to use the second frequency band.

The traffic profile may be generated at least in part by information provided by one or more of the electronic devices 10 as device (e.g., user equipment (UE)) assistance information and received by the base station 52. For example, the electronic device 10F may indicate a preferred frequency for the base station 52 to use when communicating with the electronic device 10F and/or a preferred frequency for other electronic devices 10 (e.g., electronic device 10G) to use when communicating with the electronic device 10F. For example, the preferred frequency and/or set of frequencies may correspond to hardware parameters of the electronic device 10F, such that the base station 52 may change its operation to suitably communicate with the electronic device 10F. Thus, the base station 52 may consider this information as part of the traffic profile and may subsequently adjust the muting configuration with the preferred frequency in mind.

The electronic devices 10 may additionally or alternatively provide assistance information related to a number of attempts to access the second frequency band (e.g., second frequency spectrum) over a specified period and whether the attempts were successful (or unsuccessful). The number of attempts and specified period may be used by the base station 52 to determine a rate of successful (or unsuccessful) access by a particular electronic device 10 (e.g., electronic device 10F, electronic device 10G) to the second frequency band. The period over which this information (e.g., number of attempts) is aggregated may be configured by the RF network via the base station 52. The base station 52 may adjust the muting configuration based at least in part on the number of attempts and/or the rate of successful (or unsuccessful) access.

In this way, based on overall statistics of frequency ranges requested by the electronic devices 10, such as the range of frequencies requested by the electronic devices 10 for UWB operation, and rates of unsuccessful (or successful) access to the second frequency band (e.g., UWB spectrum), the base station 52 may adjust the muting configuration periodicity and duration. Thus, the base station 52 may use the traffic profiles to optimize an allocation of resources for the muting of communications on the first frequency band (e.g., NR muting), and thus optimize a coexistence of the otherwise overlapping communications (e.g., permitting coexistence of NR communications and UWB communications).

Figure 15:
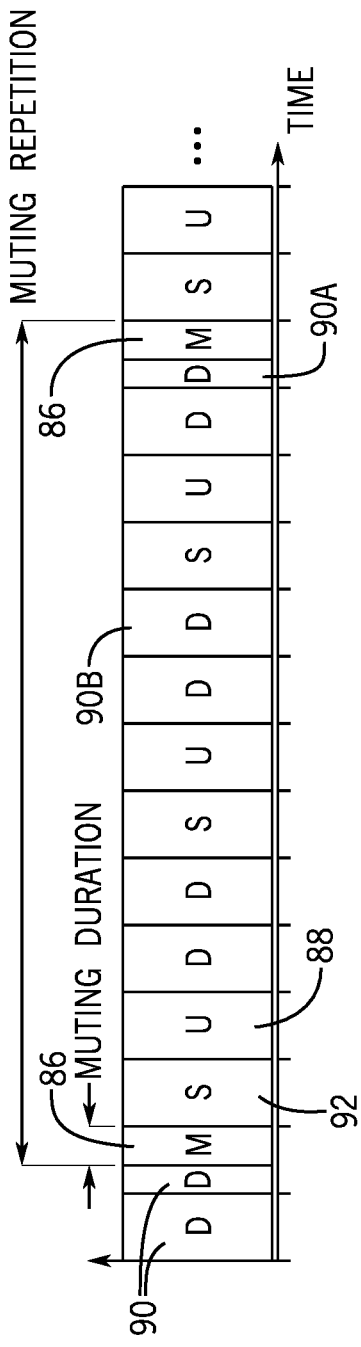
FIG. 15 is an example communication cycle diagram depicting a first communication configuration generated based on a first muting configuration, in accordance with an embodiment.
Figure 16:
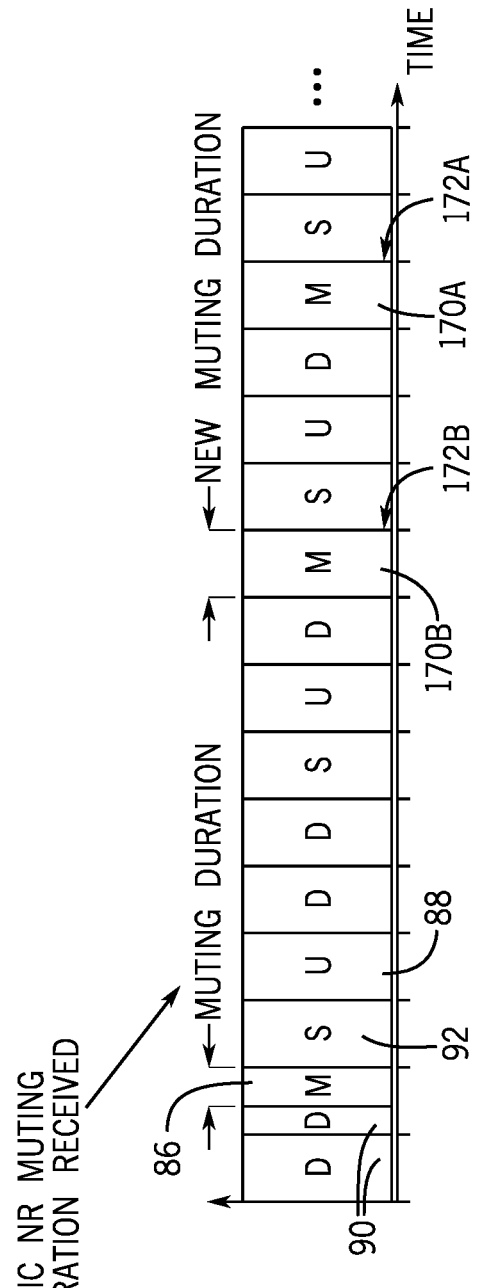
FIG. 16 is an example communication cycle diagram depicting a second communication configuration generated by adjusting the first communication configuration based on a second muting configuration that increased a duration of time used for the muting durations, in accordance with an embodiment.

To visualize the adjusted muting durations 86, FIGS. 15 and 16 illustrate an adjustment to the muting duration 86. FIG. 15 is an example communication cycle diagram depicting a communication configuration that includes the muting durations 86, the uplink durations 88, the downlink durations 90, and the special durations 92 arranged in a periodic pattern used to manage communication exchange between the electronic device 10F, the electronic device 10G, and the base station 52, according to embodiments of the present disclosure. FIG. 15 may be similar to the communication cycle diagram of FIG. 11, and thus descriptions are relied on herein. FIG. 16, however, is an example communication cycle diagram depicting the communication configuration of FIG. 15 that has been adjusted to include adjusted muting durations 170, in addition to the muting duration 86, the uplink durations 88, the downlink durations 90, and the special durations 92, according to embodiments of the present disclosure. The adjusted muting durations 170 are a relatively longer time duration as to keep communications on the first frequency stopped and/or muted for a longer period of time relative to the muting duration 86.

To make the adjustment, the downlink duration 90A was removed from the communication configuration. The base station 52 donated the time period corresponding to the downlink duration 90A to the adjusted muting duration 170A. Similarly, the base station 52 donated the time period corresponding to the downlink duration 90B to the adjusted muting duration 170B. When time of a duration is donated, the original transition between durations (e.g., an operational transition between the uplink duration 88 and the downlink duration 90) may be preserved. Preserving the original transition may enable the base station 52 to return to a periodicity of the communication configuration when an inclusion of muting durations 170 in the communication configuration is stopped. Returning to a periodicity of the communication configuration may be relatively easier when time is donated from previously allocated time periods than when a time period of the muting duration 86 is adjusted without conserving a same end time of the time period allocation (e.g., transitions indicated by arrow 172A and arrow 172B).

Figure 17:
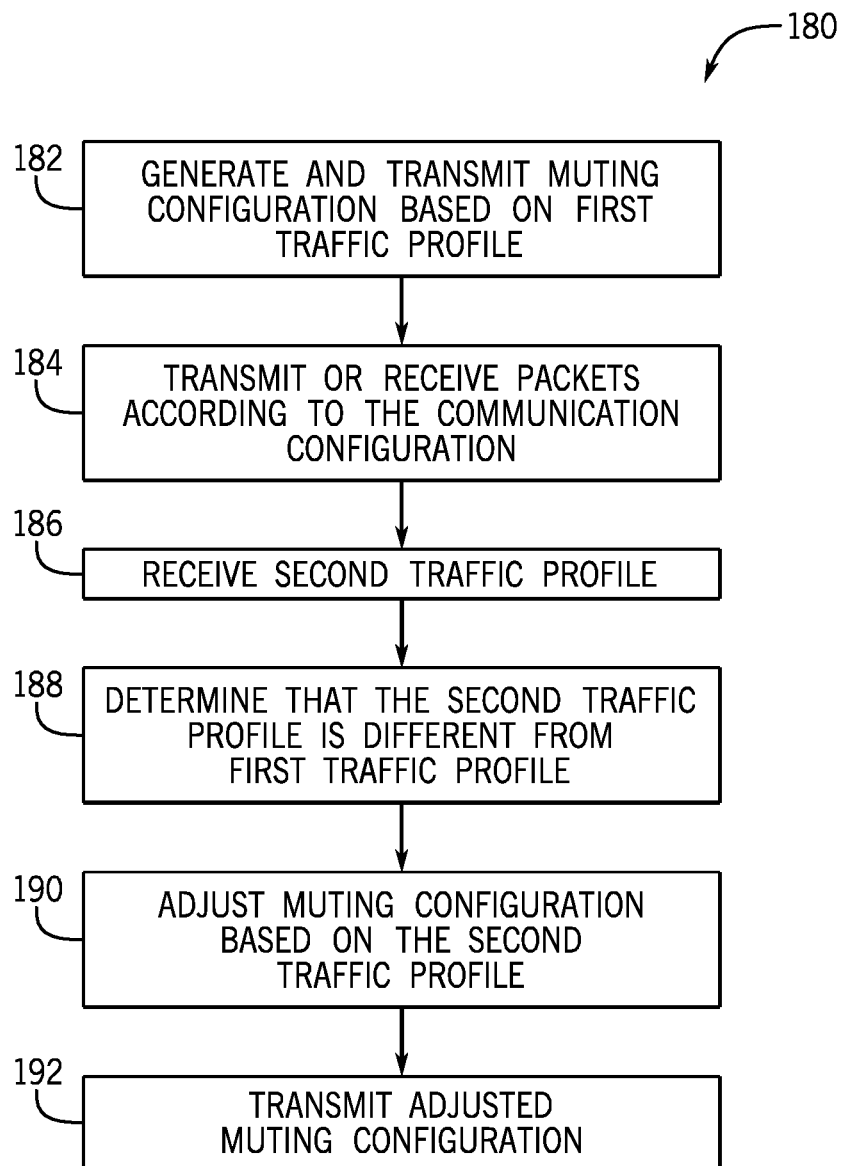
FIG. 17 is a flow chart illustrating a method for operating the base station of FIG. 7 to generate the second communication configuration of FIG. 15, in accordance with an embodiment.

Turning now to FIG. 17 to describe operations of the base station 52 to consider the traffic profiles when generating muting configurations, FIG. 17 is a flow chart illustrating a method 180 for operating the base station 52 to communicate with the electronic device 10G and/or the electronic device 10F, according to embodiments of the present disclosure. In some embodiments, the method 180 may be implemented at least in part by executing instructions stored in a tangible, non-transitory, computer-readable medium, such as the memory 14, using processing circuitry, such as processors 12 (including one or more baseband processors), or the like. However, as described herein, the method 180 is described as being performed by the base station and it is noted that any suitable electronic device 10, control system 60, or other suitable processing circuitry may perform the method 180. It is noted that although depicted and/or described in a particular order, many operations described herein may be performed in any suitable order, and some operations may be skipped altogether. It is noted that the control system 60 may perform at least a subset of the operations of the method 180 on behalf of the base station 52 to cause the base station 52 to perform the method 180.

At block 182, the base station 52 may generate and transmit a muting configuration based on a first traffic profile. As discussed with reference to FIG. 14, the traffic profile may indicate an expected load, a size of a current load, properties of a current load, expected properties of an expected load, or the like. In this way, the base station 52 may generate a first muting configuration based at least in part on a first predicted or actual number and/or predicted or actual properties of electronic devices 10 registered to the base station 52.

At block 184, the base station 52 may communicate with the electronic devices 10. Each electronic device 10 may generate a respective communication configuration based on the muting duration. The base station 52 may generate its own respective communication configuration based on the muting duration. The base station 52 may generally operate according to the method 140 of FIG. 13 to communicate with the electronic devices 10 generally operating according to the method 110 of FIG. 12.

During communication using the communication configuration that was generated based on the muting duration, the base station 52 may, at block 186, receive a second traffic profile. As discussed with reference to FIGS. 14-16, the traffic profile may indicate a change in a size of an expected load, a change in a size of a current load, a change in properties of a current load, a change in properties of an expected load, or the like.

At block 188, the base station 52 may determine that the second traffic profile is different from the first traffic profile. The base station 52 may compare the first traffic profile to the second traffic profile to determine which parameters are different and may, at block 190, adjust the muting configuration based on the changed parameters. The adjustment to the muting configuration may compensate for a change in traffic and/or operation of the electronic devices 10 indicated by the second traffic profile relative to the first traffic profile. For example, the base station 52 may increase a muting duration parameter and/or a muting repetition parameter in response to an indication that an increased number of electronic devices 10 are expected or are actively engaging in device-to-device communications on the second frequency band (e.g., increased amount of UWB communications). At block 192, the base station 52 may transmit the adjusted muting configuration to the electronic devices 10 for implementation. After receiving the adjusted muting configuration, the electronic devices 10 may repeat performance of the method 110 of FIG. 12 and/or the base station 52 may repeat performance of the method 140 of FIG. 13 to apply the adjusted muting configuration.

Figure 18:
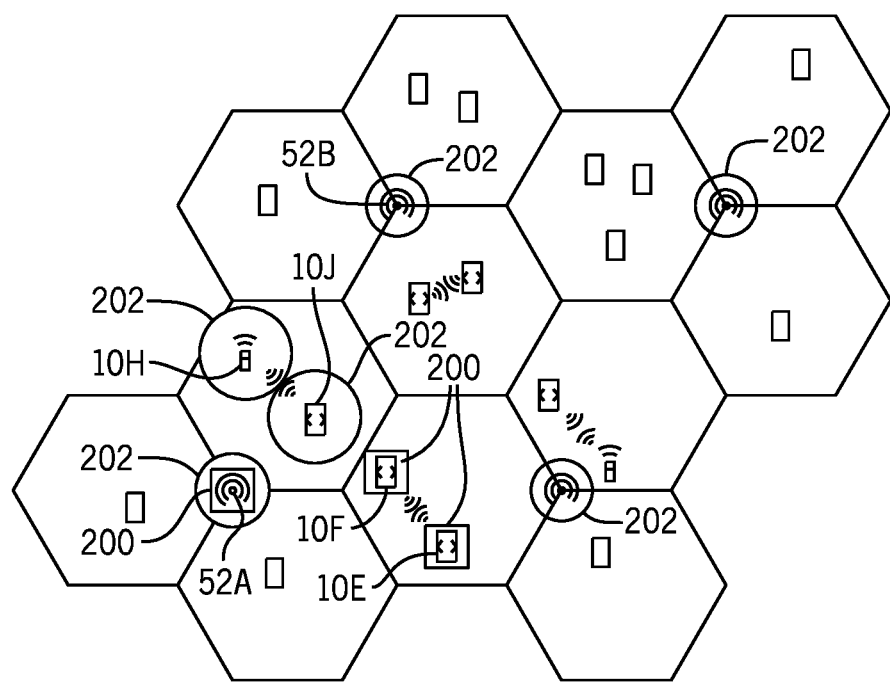
FIG. 18 is an illustrative diagram of multiple base stations communicating with multiple electronic devices according to a first communication configuration or a second communication configuration at a first time before application of a device-specific muting configuration at a second time, in accordance with an embodiment.
Figure 19:
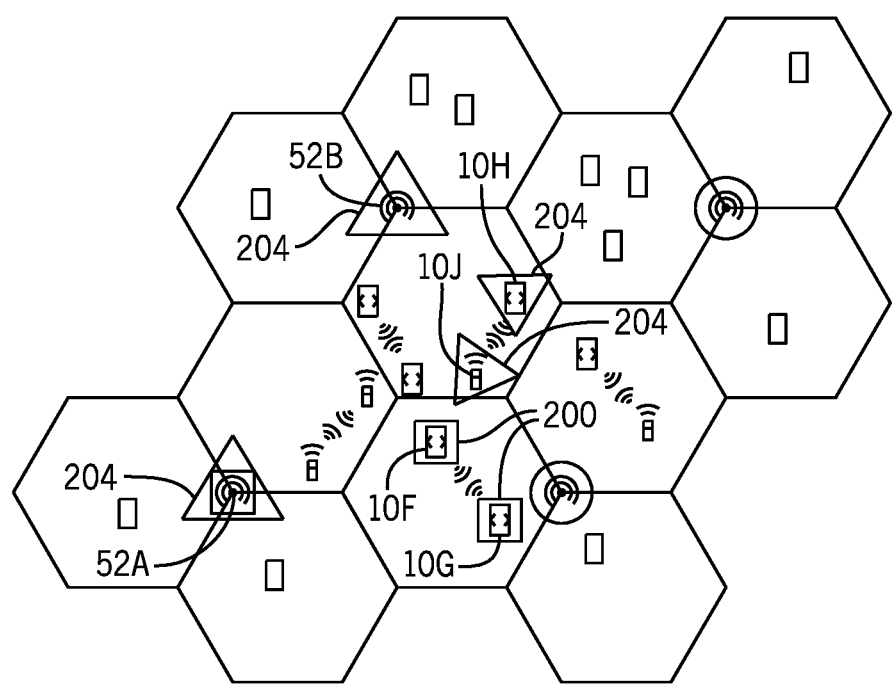
FIG. 19 is an illustrative diagram of the multiple base stations of FIG. 18 communicating with the multiple electronic devices of FIG. 18, where a subset of base stations and electronic devices communicate according to a third communication configuration generated using a device-specific muting configuration at the second time, in accordance with an embodiment.

The above-described dynamic configuration of muting durations 86 may be leveraged to further optimize coexistence of communications transmitted via overlapping frequency bands and to further minimized interference between device-to-device communications (e.g., UWB communications). FIGS. 18 and 19 depict a dynamic muting configuration that resulted in the base station 52 applying an adjusted muting configuration to a first subset of electronic devices 10 without applying the adjusted muting configuration to a second subset of electronic devices. FIG. 18 is an illustrative diagram of multiple base stations 52 (e.g., base station 52A, base station 52B) communicating with multiple electronic devices 10 (e.g., electronic device 10F, electronic device 10G) according to a first communication configuration or a second communication configuration at a first time before application of a device-specific muting configuration at a second time, according to embodiments of the present disclosure. For example, the base station 52A, the electronic device 10G, and the electronic device 10F may each operate according to a first muting configuration at a first time, while the base station 52B, the electronic device 10H, and the electronic device 10J may each operate according to a second muting configuration at the first time. However, the base station 52A may determine to adjust its muting configuration (e.g., in response to a second traffic profile).

For example, FIG. 19 is an illustrative diagram of a first subset of base stations 52 and electronic devices 10 (e.g., base station 52B, electronic device 10J, electronic device 10H) communicating according to a third communication configuration generated based on a device-specific muting configuration applied at the second time while a second subset of base stations 52 and electronic devices 10 (e.g., base station 52A, electronic device 10F, electronic device 10G) continue to communicate according to the first communication configuration, according to embodiments of the present disclosure. For ease of discussion, FIG. 18 (e.g., representative of a first time) is discussed in tandem to FIG. 19 (e.g., representative of a second time after the first time). It is noted that device-specific muting configurations may include muting durations specifically adjusted to be tailored to operation of one or more electronic devices 10 without adjusting operation of one or more other electronic devices 10. In this example, electronic device 10F and electronic device 10G may be similarly situated in device type or geographic location such that changes in load associated with one of the electronic device 10F and/or electronic device 10G may apply to the other of the electronic device 10F and/or electronic device 10G. Similarly, changes in load associated with one of the electronic device 10J and/or electronic device 10H may apply to the other of the electronic device 10J and/or electronic device 10H without applying to the electronic device 10F and/or electronic device 10G. In this way, a change may be made to the muting duration for the electronic device 10J and/or electronic device 10H without necessarily making the same change to a muting configuration for the electronic device 10F and/or electronic device 10G, and thus may be considered device-specific changes and/or localized changes.

Initially (e.g., before the first time), the base station 52A may determine to operate according to the first communication configuration (e.g., where device operation according to the first muting configuration is visualized by symbol 200 and according to the second muting configuration is visualized by symbol 202). The base station 52B may determine to operate according to a communication configuration having the second muting configuration without the first muting configuration.

After the first time and before the second time, the base station 52B may receive a second traffic profile determined, at block 188 of the method 180 of FIG. 17, to be a change from a first traffic profile. In response to the change, the base station 52B may determine to adjust its muting configuration to a third muting configuration (e.g., where device operation according to the third muting configuration is visualized in FIG. 19 by symbol 204). Thus, by the second time, the base station 52B may generate and apply the third muting configuration for use in communications. Furthermore, by the second time, some of the electronic devices 10 (e.g., electronic device 10J, electronic device 10H) may also update respective communication configurations as to comply with the third muting configuration (e.g., represented in the change from the symbol 202 to the symbol 204)

In some cases, the electronic device 10J and/or the electronic device 10H may additionally or alternatively communicatively couple to the base station 52A. In these cases, the base station 52A may receive the first traffic profile indicative of a traffic or device change affecting a subset of the electronic devices 10 without affecting another subset of the electronic devices 10. The base station 52A may use the third traffic profile to generate the third muting configuration. The base station 52A may communicate with the electronic device 10J and/or the electronic device 10H using a communication configuration generated using the third muting configuration and the first muting configuration. In this way, the base station 52A, using a same communication configuration inclusive of multiple muting configurations, may communicate with the electronic device 10F and/or electronic device 10G according to the first muting configuration (e.g., represented by the symbol 200) and may communicate with the electronic device 10J and/or electronic device 10H according to the second muting configuration.

In this way, a communication configuration may be representative of one or more muting configurations. Thus, the communication configuration may coordinate operations of electronic devices 10 to be operated according to different muting configurations. For example, the electronic device 10H may signal to the base station 52 before the second time that the electronic device 10H wants a longer duration for device-to-device communications, thus the base station 52 may generate and transmit an adjusted muting configuration to the electronic device 10H, thereby accommodating the request of the electronic device 10H.

Localized muting operations, like shown in FIGS. 18 and 19, may permit the base stations 52 to configure different electronic devices 10 with different muting configurations such that the device-to-device communications occur at different times, thereby minimizing interference resulting from simultaneous device-to-device communications. The base stations 52 may use traffic profiles indicating properties of the electronic devices 10 to trigger multiplexed muting configurations to decrease amounts of interferences. For example, the base station 52 may selectively apply different muting configurations in regions of the RF network affected by relatively high device density during time periods that correspond to relatively high usage of device-to-device communications as a way to compensate for any interferences.

Figure 20:
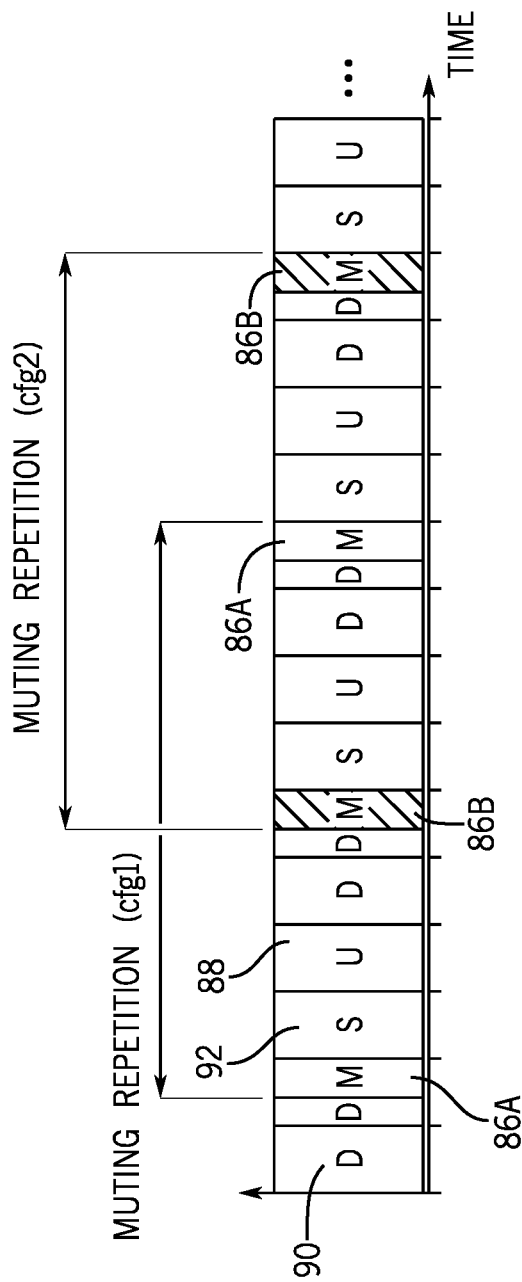
FIG. 20 is an example communication cycle diagram depicting the first communication configuration corresponding to a first electronic device of FIG. 18, and the second communication configuration corresponding to a second electronic device of FIG. 18, in accordance with an embodiment.

For the case when the electronic device 10H, the electronic device 10J, the electronic device 10F, and the electronic device 10G each correspond to muting configurations managed by the base station 52A, FIG. 20 is an example communication cycle diagram of the first communication configuration associated with the base station 52A at the first time, according to embodiments of the present disclosure. In this example, the first communication configuration accommodates the first muting configuration (e.g., represented in FIG. 18 by symbol 200) and the second muting configuration (e.g., represented in FIG. 18 by symbol 202). In FIG. 20, the first muting configuration may define muting durations 86A and the second muting configuration may define muting durations 86B. In this way, the base station 52A, the electronic device 10H, the electronic device 10J, the electronic device 10F, and/or the electronic device 10G may each operate to coordinate device-to-device communications and communications with the base station 52A to reduce interference between the first frequency band and the second frequency band.

Figure 21:
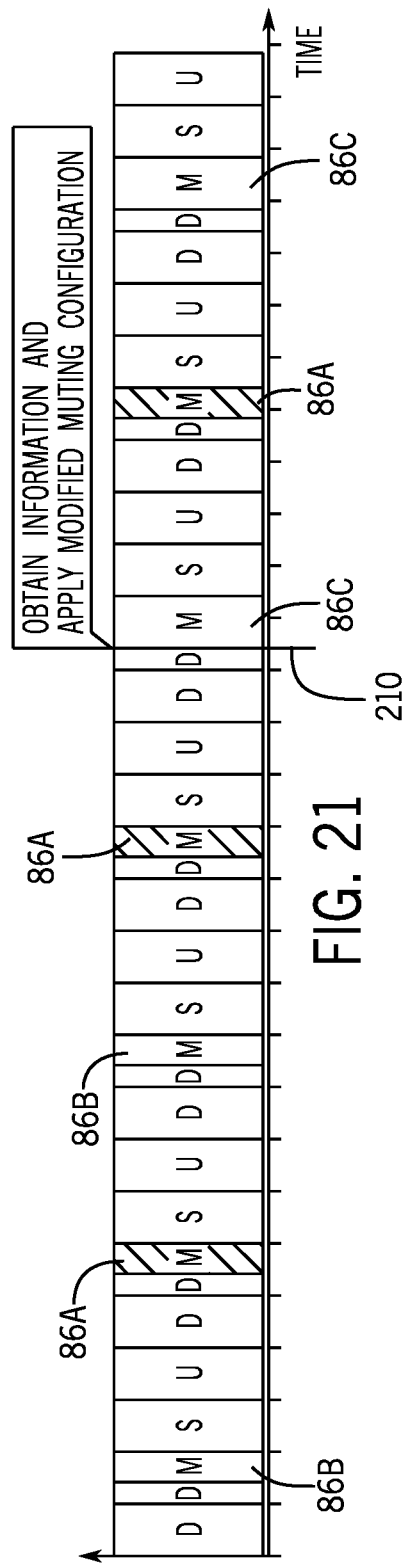
FIG. 21 is an example communication cycle diagram depicting the first communication configuration of FIG. 20 after an adjustment to the second communication configuration without an adjustment being made to the first communication configuration, where the adjusted second communication configuration corresponds to the third communication configuration of FIG. 19, in accordance with an embodiment.

In some cases, the base station 52A may receive a changed traffic profile (e.g., as described with respect to the method 180 of FIG. 17). For the case when the electronic device 10H, the electronic device 10J, the electronic device 10F, and the electronic device 10G each correspond to muting configurations managed by the base station 52A, FIG. 21 is an example communication cycle diagram depicting the first communication configuration associated with the base station 52A at the first time and a second communication configuration associated with the base station 52B at a second time, according to embodiments of the present disclosure. In this example, the first communication configuration accommodates the first muting configuration (e.g., represented in FIG. 18 by symbol 200) and the second muting configuration (e.g., represented in FIG. 18 by symbol 202). Furthermore, in this example, the second communication configuration accommodates the first muting configuration (e.g., represented in FIG. 18 by symbol 200) and the third muting configuration (e.g., represented in FIG. 19 by symbol 204).

In FIG. 21, the first muting configuration may define muting durations 86A, the second muting configuration may define muting durations 86B, and the third muting configuration may define muting durations 86C. In this way, the base station 52A, the electronic device 10H, the electronic device 10J, the electronic device 10F, and/or the electronic device 10G may each operate to coordinate device-to-device communications and communications with the base station 52A. Coordinating device-to-device communications may reduce interference between the first frequency band and the second frequency band and/or may be combined with adjusting or updating muting configurations in response to a change in a traffic profile (e.g., a change in the traffic profile identified and compensated for before time 210 corresponding to the second time depicted by FIG. 19). This may permit subsets of electronic devices 10 to operate according to independently defined muting configurations.

Figure 22:
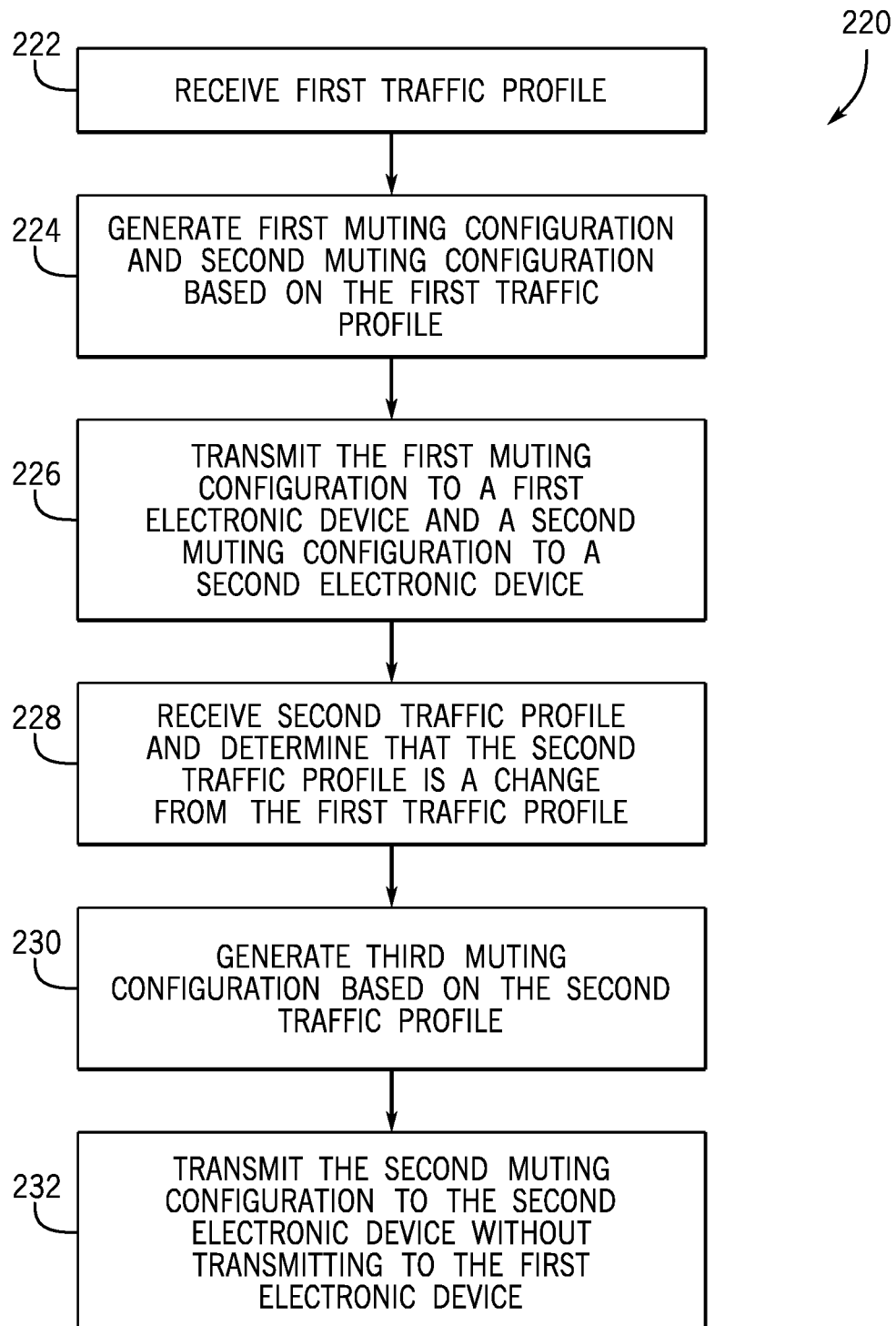
FIG. 22 is a flow chart illustrating a method for operating the base station of FIG. 7 to generate a first muting configuration corresponding to some electronic devices of FIG. 1 and/or FIG. 7 and to generate a second muting configuration corresponding to other of the electronic devices of FIG. 1 and/or FIG. 7, in accordance with an embodiment.

To help explain, FIG. 22 is a flow chart illustrating a method 220 for operating the base station 52 to generate a first muting configuration and a second muting configuration before the first time of FIG. 18 and to generate a third muting configuration before the second time of FIG. 19, according to embodiments of the present disclosure. In some embodiments, the method 220 may be implemented at least in part by executing instructions stored in a tangible, non-transitory, computer-readable medium, such as the memory 14, using processing circuitry, such as processors 12 (including one or more baseband processors), or the like. However, as described herein, the method 220 is described as performed by the base station 52 and it is noted that any suitable electronic device 10, control system 60, or other suitable processing circuitry may perform the method 220. It is noted that although depicted and/or described in a particular order, many operations described herein may be performed in any suitable order, and some operations may be skipped altogether. Furthermore, it is noted that the control system 60 may perform at least a subset of the operations of the method 220 on behalf of the base station 52 to permit the base station 52 to perform the method 220.

Keeping this in mind, at block 222, the base station 52A may receive a first traffic profile. The first traffic profile may indicate one or more properties and/or one or more loads associated with the electronic device 10H, the electronic device 10J, the electronic device 10F, and/or the electronic device 10G. At block 224, the base station 52A may generate a first muting configuration corresponding to the electronic device 10F and/or the electronic device 10G and generate a second muting configuration corresponding to the electronic device 10H and/or the electronic device 10J. The base station 52A may generate the first muting configuration and/or the second muting configuration based at least in part on the first traffic profile received at block 222. After generation of the first muting configuration and/or the second muting configuration, the base station 52A, at block 226, may transmit the first muting configuration to the electronic device 10F and/or the electronic device 10G and/or transmit the second muting configuration to the electronic device 10H and/or the electronic device 10J. The electronic device 10H, the electronic device 10J, the electronic device 10F, and/or the electronic device 10G may each generate a respective communication configuration in response to the muting configurations that implement the coordinated muting durations 86 into the respective operations of the electronic devices 10.

At block 228, the base station 52A may receive a second traffic profile and determine that the second traffic profile is different from the first traffic profile received at block 222. In particular, the base station 52A may determine that the second traffic profile is changed in properties, load, traffic, or the like relative to the first traffic profile. It is noted that when the second traffic profile is not different from the first traffic profile, the base station 52A may ignore the second traffic profile and/or may not change muting configurations in response to the second traffic profile.

At block 230, the base station 52A may use the second traffic profile to determine that a localized change occurred to a subset of the electronic devices 10 (e.g., electronic device 10H, electronic device 10J) and/or may update the second muting configuration to a third muting configuration. The base station 52A may generate the third muting configuration based on the second traffic profile.

At block 232, the base station 52A may transmit the third muting configuration to the subset of the electronic devices 10 associated with the change in the second traffic profile (e.g., electronic device 10H, electronic device 10J). The base station 52A may not transmit the third muting configuration to the subset of the electronic devices 10 not affected by the change in the second traffic profile (e.g., electronic device 10F, electronic device 10G). When the subset of the electronic devices 10 receive the third muting configuration, the subset of electronic devices 10 may update the communication configuration to represent muting durations identified by the third muting configuration as opposed to the second muting configuration.

Figure 23:
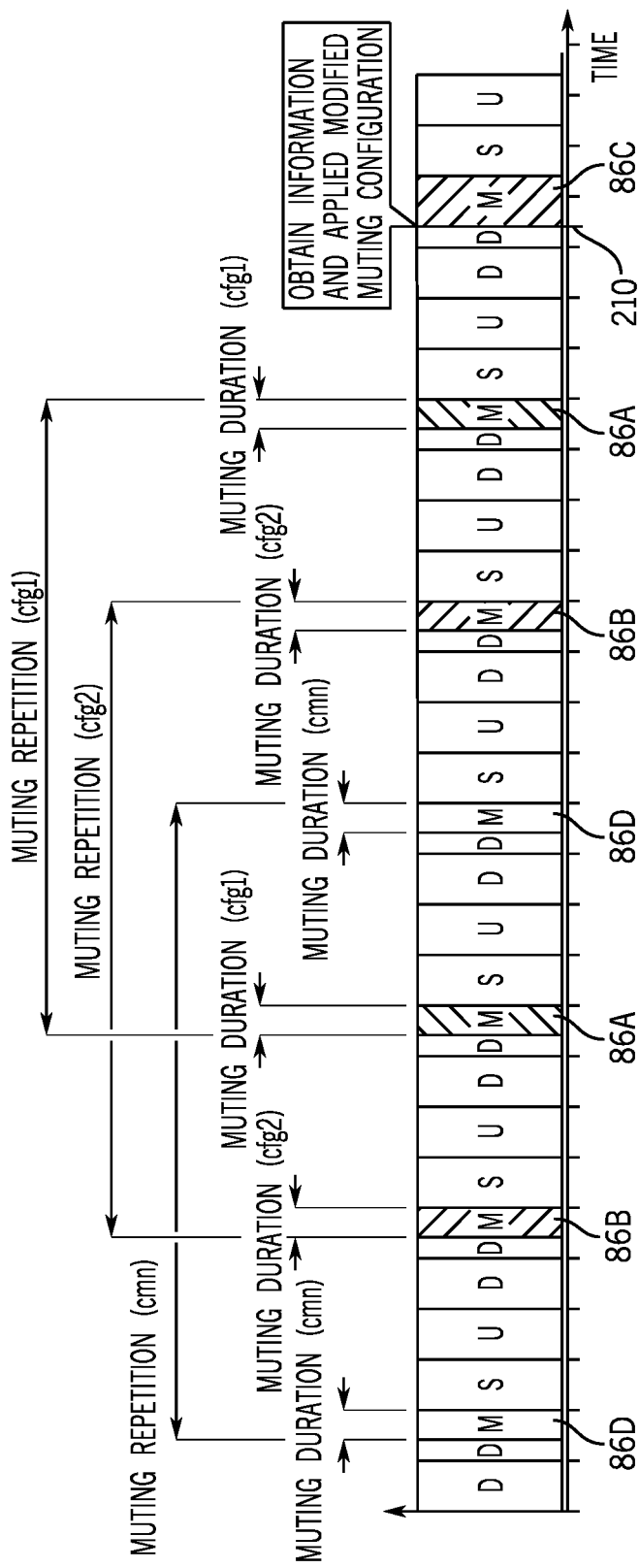
FIG. 23 is an example communication cycle diagram depicting a common communication configuration, the first communication configuration of FIG. 21, and the second communication configuration of FIG. 21, and the third communication configuration of FIG. 22, in accordance with an embodiment.

In some cases, the base station 52A may transmit a common muting configuration to one or more electronic devices 10 (e.g., the electronic device 10H, the electronic device 10J, the electronic device 10F, the electronic device 10G). FIG. 23 is an example communication cycle diagram depicting the first communication configuration that accommodates the common muting configuration, according to embodiments of the present disclosure. In this example, the first communication configuration accommodates the first muting configuration (e.g., represented in FIG. 18 by symbol 200), the second muting configuration (e.g., represented in FIG. 18 by symbol 202), and after time 210, the third muting configuration (e.g., represented in FIG. 19 by symbol 204).

Discussions relevant from FIG. 20 are relied upon in reference to discussions of FIG. 23 for the sake of brevity.

For example, the base station 52A may generate a first muting configuration corresponding to the electronic device 10F and/or the electronic device 10G, may generate a second muting configuration corresponding to the electronic device 10H and/or the electronic device 10J, and/or may generate a common muting configuration for any other electronic devices 10 registered to the base station 52A. The common muting configuration may correspond to the muting duration 86D. The base station 56A may update a common muting configuration in response to global traffic profiles. For example, a third party regulatory agency may generate standards that the RF network provider uses to generate a global traffic profile. Global traffic profiles may also be generated based on cell topologies of some RF networks.

For example, an RF network may be divided into cells, where each cell may correspond to one or more base stations 52. In cell-based RF networks, the base stations 52 may receive traffic profiles according to properties and/or loads of the cell. Cell information may be received by the base stations 52 additional to or alternative of traffic profiles indicative of electronic devices 10 communicatively coupled to the base stations. Information of the cell may correspond to globally-applicable information that may be used to adjust one or more muting configurations managed by a respective base station 52. It is noted that although not particularly called out in the discussions of FIG. 19, cells are depicted via the hexagon outlines present in the figure.

Figure 24:
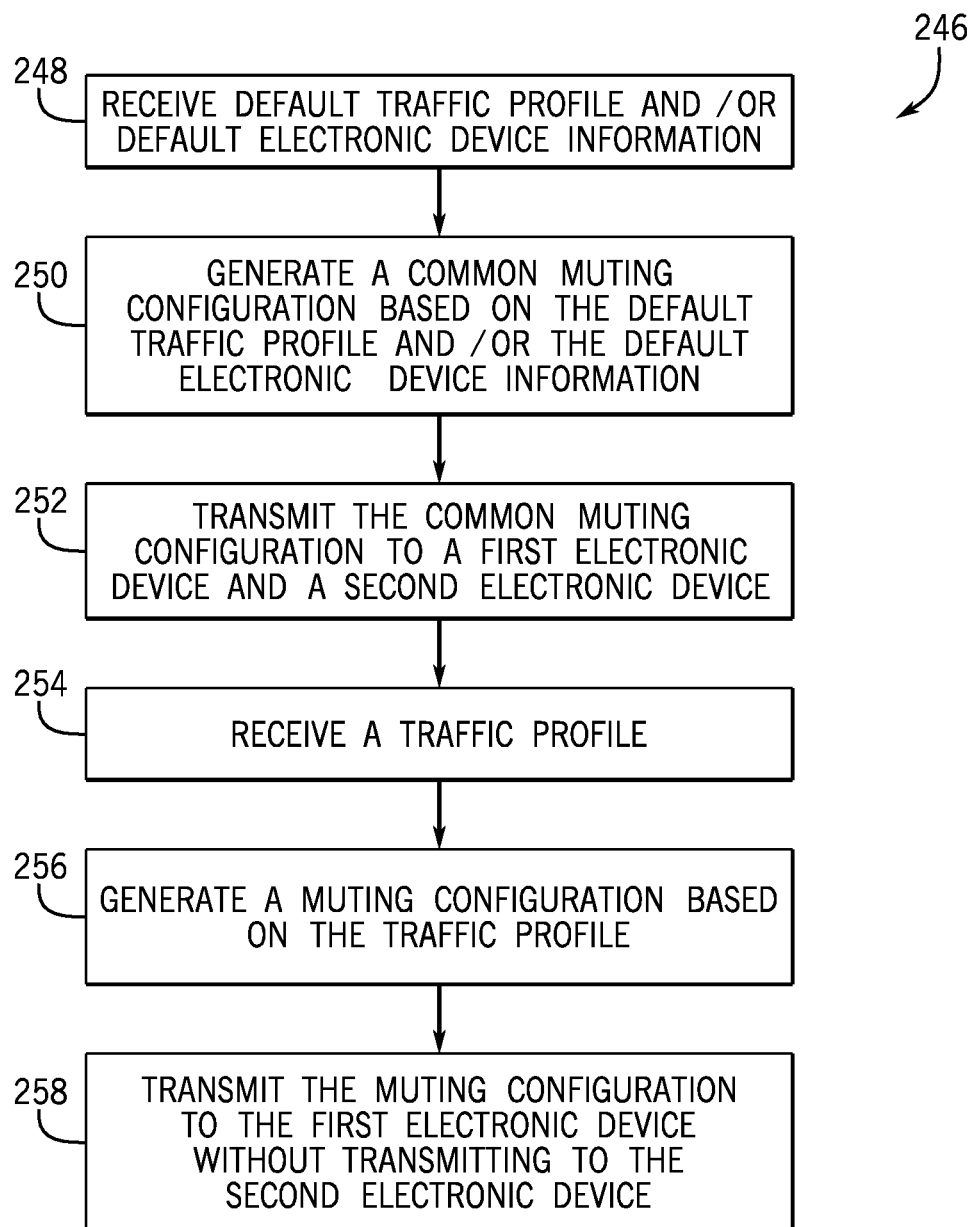
FIG. 24 is a flow chart illustrating a method for operating a base station of FIG. 8 to generate a common muting configuration corresponding to default information and to generate a first muting configuration corresponding to the first electronic device of FIG. 18 corresponding to a traffic profile and/or actual electronic device information, in accordance with an embodiment.

To help explain, FIG. 24 is a flow chart illustrating a method 246 for operating the base station 52A to generate a first muting configuration based on default traffic profile and/or default electronic device information before the first time of FIG. 18, according to embodiments of the present disclosure. In some embodiments, the method 246 may be implemented at least in part by executing instructions stored in a tangible, non-transitory, computer-readable medium, such as the memory 14, using processing circuitry, such as processors 12 (including one or more baseband processors), or the like. However, as described herein, the method 246 is described as being performed by the base station 52A and it is noted that any suitable electronic device 10, control system 60, or other suitable processing circuitry may perform the method 246. It is noted that although depicted and/or described in a particular order, many operations described herein may be performed in any suitable order, and some operations may be skipped altogether. It is noted that the control system 60 may perform at least a subset of the operations of the method 246 on behalf of the base station 52A to permit the base station 52A to perform the method 246.

Keeping this in mind, at block 248, the base station 52A may receive a default traffic profile and/or default electronic device information. Reception of the default traffic profile and/or default electronic device information may correspond to powering-on of the base station 52A. The default traffic profile and/or default electronic device information may correspond to standard operational expectations for the RF network as defined by the RF network provider. These standard operational expectations may be provided with the understanding that the operations are adjusted at a later time in response to actual operating conditions and/or in response to expected operating conditions.

At block 250, the base station 52A may generate a common muting configuration based at least in part on the default traffic profile and/or default electronic device information. The common muting configuration may correspond to the muting durations 86D of FIG. 23. It is noted that in some cases, the default traffic profile and/or default electronic device information may correspond to an ongoing operation of the RF network, and thus the common muting configuration may initialize communication operations to the ongoing operation of the RF network. The base station 52A, at block 252, may transmit the common muting configuration to the electronic devices 10, such as the electronic device 10J and/or the electronic device 10G. The base station 52A may transmit the common muting configuration to each electronic device 10 registered to its RF network.

At block 254, the base station 52A may receive a traffic profile indicative of an operation of the RF network and/or an expected operation of the RF network. The traffic profile may indicate that one or more operations of the RF network changed since a deployment of the common muting configuration. At block 256, the base station 52A may generate a muting configuration based on the traffic profile. Generating the muting configuration based on the traffic profile may include adjusting the common muting configuration to compensate communication operations for any changes and/or any current operations in the traffic profile. When the muting configuration is generated, at block 528, the base station 52A may transmit the muting configuration to one or more electronic devices 10 affected by properties and/or loads indicated by the traffic profile. For example, the base station 52A may transmit the muting configuration to the electronic device 10J without transmitting to the electronic device 10G.

It is noted that in some cases the base station 52A may internally assign respective muting configurations to respective electronic devices 10 without transmitting the muting configuration. In this way, the base station 52A may operate according to the respective muting configuration when communicating with the respective electronic device 10 without transmitting the muting configuration to the respective electronic device 10. For example, the base station 52A may know a periodicity of UWB communications between electronic devices 10 and may operate, independent of operations of the electronic devices 10, to avoid transmission of NR communications when UWB communications are expected to occur by following a respectively assigned communication configuration for one or more of the communicating electronic devices 10.

In some cases, electronic devices 10 entering the RF network maintained by the base station 52A and/or restricted-bandwidth electronic devices 10 may use a receiver 54 that operates to perform downlink operations without performing uplink operations. This receiver 54 may download the common muting configuration and operate according to the common muting durations 86D, for example, using a generated communication configuration that does not include uplink durations 88.

Technical effects of the present disclosure include systems and methods for temporarily muting uplink and/or downlink operations of a base station to permit device-to-device communications to occur. In some cases, the uplink and downlink communications from the base station are transmitted on a first frequency band that overlaps a second frequency band used to transmit device-to-device communications. Operating the base station and/or electronic devices in accordance with muting configurations may improve communication operations since an amount of interference experienced when transmitting device-to-device communications may be reduced when at least partially simultaneous uplink or downlink communications are paused.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device for wireless communication comprising:
   radio frequency communication circuitry configured to communicate with a first electronic device according to a first communication configuration having a first muting configuration; and
   one or more processors communicatively coupled to the radio frequency communication circuitry and configured to
      receive a first traffic profile at the radio frequency communication circuitry, the first traffic profile corresponding to a plurality of electronic devices expected to communicate with the radio frequency communication circuitry, and
      communicate a data packet according to a second muting configuration based on the first traffic profile, the second muting configuration defining when communications of a first type are to be paused.

2. The electronic device of claim 1, the one or more processors being configured to generate a third muting configuration based on a second traffic profile, the first muting configuration being based on the second traffic profile.

3. The electronic device of claim 2, the one or more processors being configured to
   determine that the first traffic profile is different from the second traffic profile; and
   generate the second muting configuration based on the determination.

4. The electronic device of claim 2, the one or more processors being configured to, at the radio frequency communication circuitry, transmit the third muting configuration to a second electronic device and to transmit the first muting configuration to the first electronic device.

5. The electronic device of claim 1, wherein the second muting configuration comprises muting durations having a different muting duration than a previously used muting duration associated with the first muting configuration.

6. The electronic device of claim 1, wherein the second muting configuration is configured to define when the communications of the first type are to be permitted.

7. The electronic device of claim 1, wherein the first traffic profile comprises a schedule of events or public facilities corresponding to upcoming events configured to indicate an expected demand.

8. The electronic device of claim 1, wherein the one or more processors are configured to generate the second muting configuration based on device assistance information associated with the first electronic device, wherein the device assistance information comprises a parameter associated with operation of the one or more processors, the radio frequency communication circuitry, or both.

9. The electronic device of claim 1, wherein the one or more processors are configured to receive a default traffic profile for a network at the radio frequency communication circuitry and generate the first muting configuration based on the default traffic profile.

10. An electronic device, comprising:
    a transceiver configured to communicate via a radio frequency (RF) network according to a first communication configuration having a first muting configuration; and
    one or more processors communicatively coupled to the transceiver and configured to
       receive a second muting configuration via the transceiver, the second muting configuration comprising an indication of a different periodic pattern than that defined in the first muting configuration,
       generate a second communication configuration based at least in part on the second muting configuration,
       write the second communication configuration over the first communication configuration in memory, and
       communicate a data packet according to the second communication configuration at the transceiver.

11. The electronic device of claim 10, wherein the first muting configuration defines a first pattern to follow when pausing and permitting communications of a first type, and wherein the second muting configuration defines a second pattern to follow when pausing and permitting the communications of the first type.

12. The electronic device of claim 10, wherein the one or more processors are configured to:
    generate device assistance information, wherein the device assistance information is indicative of a parameter associated with operation of the one or more processors, the transceiver, or both;
    transmit the device assistance information to a communication system at the transceiver; and
    receive the second muting configuration at the transceiver, the second muting configuration generated based on the device assistance information.

13. The electronic device of claim 12, wherein the device assistance information comprises a number of attempts to access a frequency band over a time period and an indication of a number of successful attempts to access the frequency band.

14. The electronic device of claim 10, wherein the one or more processors are configured to:
    generate an indication of a preferred frequency range to use when communicating via the RF network; and
    transmit the indication of the preferred frequency range to a communication system at the transceiver.

15. A method for wireless communications of a communication system, comprising:
    communicating with first user equipment using radio frequency communication circuitry and based on a first communication configuration, the first communication configuration comprising a default parameter referenced when communicating with any of a plurality of electronic devices;

receiving a first traffic profile using the radio frequency communication circuitry, the first traffic profile corresponding to a plurality of user equipment expected to communicate with the radio frequency communication circuitry;

transmitting a first muting configuration to the first user equipment using the radio frequency communication circuitry based on the first traffic profile, the first muting configuration defining when communications of a first type are to be paused and when the communications of the first type are to be permitted; and communicating with the first user equipment using the radio frequency communication circuitry according to the first muting configuration.

16. The method of claim 15, comprising:

communicating with a second user equipment using the radio frequency communication circuitry and based on the first communication configuration;

transmitting a second muting configuration to the second user equipment using the radio frequency communication circuitry based on the first traffic profile, the second muting configuration defining when communications of a second type are to be paused and when the communications of the second type are to be permitted; and communicating with the second user equipment using the radio frequency communication circuitry according to the second muting configuration.

17. The method of claim 16, wherein the first muting configuration is different from a default muting configuration corresponding to the first communication configuration and from the second muting configuration.

18. The method of claim 16, comprising:

receiving a second traffic profile using the radio frequency communication circuitry;

determining that the first traffic profile is different from the second traffic profile; and transmitting a third muting configuration to the second user equipment based on the determination.

19. The method of claim 15, wherein the first traffic profile comprises an indication of expected demand based on a geographical region associated with the radio frequency communication circuitry.

20. The method of claim 15, comprising:

receiving device assistance information from the first user equipment using the radio frequency communication circuitry, wherein the device assistance information is indicative of a parameter associated with the radio frequency communication circuitry; and transmitting a second muting configuration to the first user equipment using the radio frequency communication circuitry based on the device assistance information and the first traffic profile.

* * * * *